US011106702B2

(12) United States Patent
Batruni

(10) Patent No.: US 11,106,702 B2
(45) Date of Patent: *Aug. 31, 2021

(54) EFFICIENT DATA CLUSTERING

(71) Applicant: Cyber Atomics, Inc., Danville, CA (US)

(72) Inventor: Roy Batruni, Danville, CA (US)

(73) Assignee: Cyber Atomics, Inc., Danville, CA (US)

(*) Notice: Subject to any disclaimer, the term of this patent is extended or adjusted under 35 U.S.C. 154(b) by 126 days.

This patent is subject to a terminal disclaimer.

(21) Appl. No.: 16/676,970

(22) Filed: Nov. 7, 2019

(65) Prior Publication Data

US 2020/0175042 A1 Jun. 4, 2020

Related U.S. Application Data

(63) Continuation of application No. 15/681,200, filed on Aug. 18, 2017, now Pat. No. 10,521,458.

(60) Provisional application No. 62/379,633, filed on Aug. 25, 2016.

(51) Int. Cl.
*G06F 16/28* (2019.01)
*G06F 16/901* (2019.01)
*G06F 17/14* (2006.01)
*G06F 17/16* (2006.01)

(52) U.S. Cl.
CPC ........ *G06F 16/285* (2019.01); *G06F 16/9024* (2019.01); *G06F 17/142* (2013.01); *G06F 17/16* (2013.01)

(58) Field of Classification Search
CPC .. G06F 16/285; G06F 17/142; G06F 16/9024; G06F 17/16; G06F 17/10; G06N 5/022; G06N 20/00
See application file for complete search history.

(56) References Cited

U.S. PATENT DOCUMENTS

| | | |
|---|---|---|
| 7,451,173 B1 | 11/2008 | Van Benthem |
| 9,798,701 B2 | 10/2017 | Narayanaswami |
| 2004/0008803 A1 | 1/2004 | Aldrovandi |
| 2006/0122714 A1 | 6/2006 | Batruni |
| 2008/0317172 A1 | 12/2008 | Zhang |
| 2016/0070833 A1 | 3/2016 | Lyumkis |

OTHER PUBLICATIONS

"Introduction to computer—storing instructions and information", PowerPoint Presentation, Emory College of Arts and Sciences, Department of Math and Computer Science, 2011.
(Continued)

*Primary Examiner* — Jorge A Casanova
(74) *Attorney, Agent, or Firm* — Van Pelt, Yi & James LLP

(57) ABSTRACT

A data processing technique includes: accessing a matrix (M) representing a graph; wherein: the graph comprises a plurality of nodes to be clustered and a plurality of edges; an edge in the plurality of edges represents an association between two of the plurality of nodes; and an entry of the matrix has a corresponding edge among the plurality of edges. The technique further includes performing an operation on the matrix to generate a result matrix, the operation includes a multiplication function on the matrix; and identifying one or more clusters among the plurality of nodes, based at least in part on the result matrix, including detecting one or more vertices among the plurality of nodes using the result matrix.

25 Claims, 32 Drawing Sheets

(56) References Cited

OTHER PUBLICATIONS

Andrzej Cichocki. "Era of big data processing: A new approach via tensor networks and tensor decompositions." arXiv preprint arXiv:1403.2048, pp. 1-30 (2014).
Behjat et al. "Anatomically-adapted graph wavelets for improved group-level fMRI activation mapping." NeuroImage 123, pp. 185-199 (2015).
Kernfeld et al. "Tensor-tensor products with invertible linear transforms." Linear Algebra and its Applications, pp. 1-25 (2014).
Leonardi et al. "Tight wavelet frames on multislice graphs." IEEE Transactions on Signal Processing, vol. 61 No. 13, pp. 3357-3367 (2013).
Mugnier et al. "Pupil configuration optimality criterion in synthetic aperture optics." Proceedings of SPIE 2477, Spaceborne Interferometry II. vol. 2477, pp. 124-131, 1995.
Nagy et al. "Kronecker product approximation for preconditioning in three-dimensional imaging applications." IEEE Transactions on Image Processing vol. 15 No. 3, pp. 604-613 (2006).
Sandryhaila et al. "Big data analysis with signal processing on graphs: Representation and processing of massive data sets with irregular structure." IEEE Signal Processing Magazine, vol. 31 No. 5, pp. 80-90 (2014).
Wolfram Mathworld, http://mathworld.wolfram.com/clusterAnalysis.html, Internet Archive Wayback Machine screen capture, Apr. 13, 2016 (Year: 2016).
Wolfram Mathworld, http://mathworld.wolfram.com/graph.html, screen capture from Internet Archive Wayback Machine, Feb. 20, 2016 (Year: 2016).
Wolfram Mathworld, http://mathworld.wolfram.com/inversefunction.html, screen capture from Internet Archive Wayback Machine, Apr. 2, 2015 (Year: 2015).
Wolfram Mathworld, http://mathworld.wolfram.com/singularvaluedecomposition.html, screen capture from Internet Archive Wayback Machine, Sep. 5, 2015 (Year: 2015).
Wolfram Mathworld, http://mathworld.wolfram.com/tensor.html, Internet Archive Wayback Machine screen capture, Apr. 3, 2016 (Year: 2016).
Wolfram Mathworld, http://mathworld.wolfram.com/vector.html, screen capture from Internet Archive Wayback Machine, Nov. 20, 2015 (Year: 2015).
Wolfram Mathworld, http://mathworld.wolfram.com/vectorspacetensorproduct.html, screen capture from Internet Archive Wayback Machine, Apr. 17, 2015 (Year: 2015).
Wolfram Mathworld, http://mathworld.wolfram.com/fastfouriertransform.html, screen capture from Internet Archive Wayback Machine, Sep. 5, 2015 (Year: 2015).
Wolfram Mathworld, http://mathworld.wolfram.com/convolution.html, Internet Archive Wayback Machine screen capture, Sep. 5, 2015 (Year: 2015).
Zhang et al. "Denoising and completion of 3D data via multidimensional dictionary learning." arXiv preprint arXiv:1512.09227, pp. 80-90 (2015).

Most Significant Component of 5-dimensional Correlation: Zoom in to 100 Airports, Pick Worst Delay Bin 4-Dimensional Stock-Price-Time-Exchange Rate model.

EFFICIENT DATA CLUSTERING

CROSS REFERENCE TO OTHER APPLICATIONS

This application is a continuation of co-pending U.S. patent application Ser. No. 15/681,200, entitled EFFICIENT DATA CLUSTERING filed Aug. 18, 2017 which is incorporated herein by reference for all purposes, which claims priority to U.S. Provisional Patent Application No. 62/379,633 entitled MULTIDIMENSIONAL DATA PROCESSING filed Aug. 25, 2016 which is incorporated herein by reference for all purposes.

BACKGROUND OF THE INVENTION

Cluster analysis (also referred to as clustering) is a technique for grouping objects into groups (referred to a cluster) according to certain criteria such that objects in the same group are more similar to each other than those in other groups. Clustering is commonly used in data mining, statistical data analysis, machine learning, pattern recognition, and many other data processing applications. It is sometimes used to pre-process data for further analysis.

Existing clustering techniques such as k-means typically represent objects in a two dimensional space and rely on search-and-eliminate computations to cluster data. These techniques often require multiple iterations and thus large amounts of processor cycles and/or memory, especially for processing massive amounts of data. Further, existing techniques often rely on ad hoc approaches whose implementations are usually iterative and slow. The results are often limited in terms of providing insight into complex relationships among data points and effectively measuring the influence of the clusters. Because the processing usually treats data sets independently, information about the interconnections between different types of data is sometimes lost. It would be useful to have techniques that are more efficient and require less computational resources. It would also be useful to have analytical solutions that are more easily parallelized, and that are able to provide greater insight into the data relationships in multiple dimensions.

BRIEF DESCRIPTION OF THE DRAWINGS

Various embodiments of the invention are disclosed in the following detailed description and the accompanying drawings.

DETAILED DESCRIPTION

Figure 1:
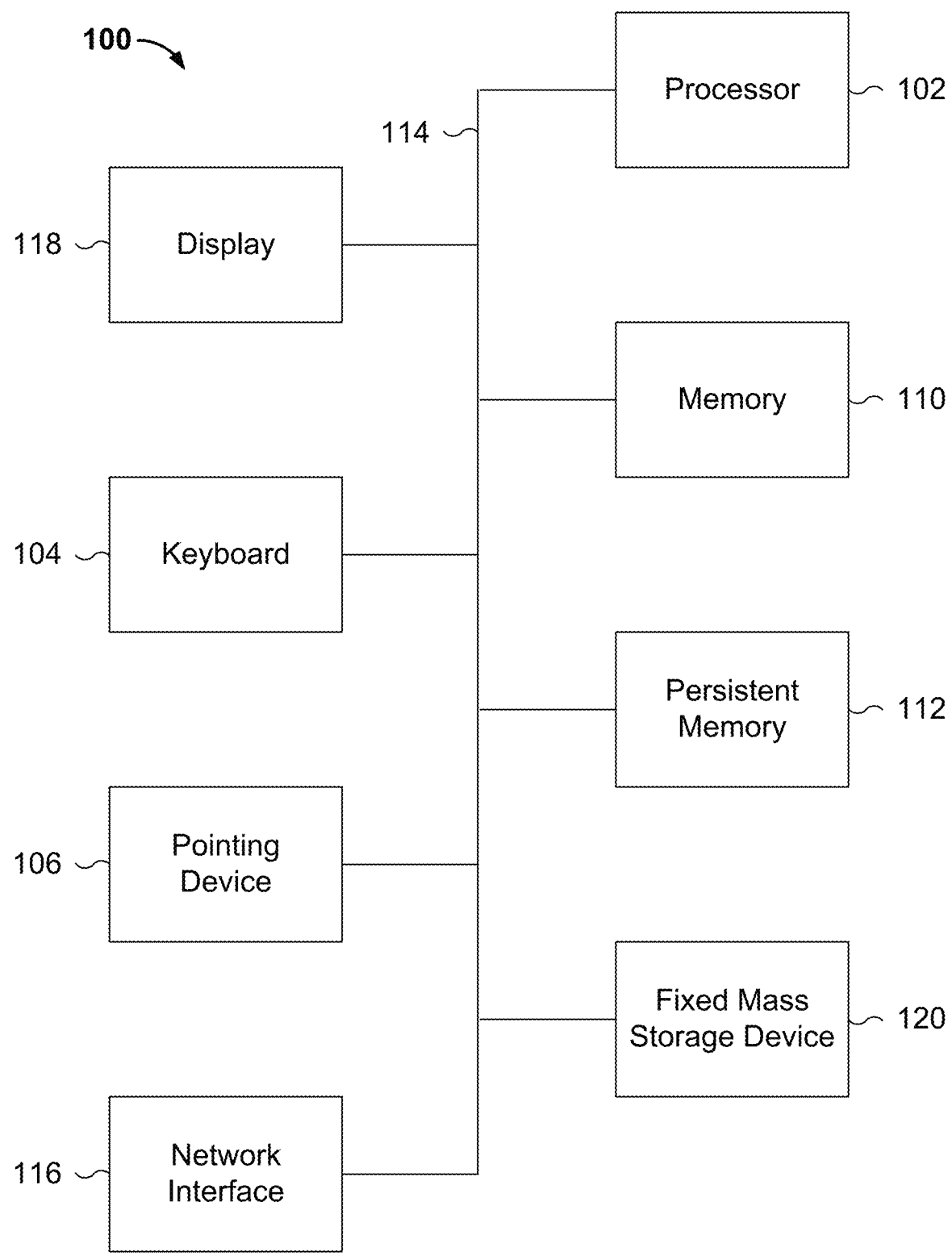
FIG. 1 is a functional diagram illustrating a programmed computer system for performing data clustering in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data processing is disclosed. In some embodiments, the data processing includes accessing a matrix (M) representing a graph; performing an operation on the matrix to generate a result matrix, the operation including a multiplication function on the matrix; and identifying one or more clusters among the plurality of nodes based at least in part on the result matrix, including detecting one or more vertices among the plurality of nodes using the result matrix. In some embodiments, the data processing includes accessing a tensor; performing Fourier Transform on the tensor to obtain a plurality of harmonic matrices; performing singular value decompositions (SVDs) on the plurality of harmonic matrices to obtain a plurality of corresponding SVD results; reducing the plurality of SVD results, including selecting one or more dominant components in the plurality of corresponding SVD results to obtain a plurality of reduced results; and performing Inverse Fourier Transform on the plurality of reduced results to obtain a de-noised tensor that expresses stronger and clearer linkages of nodes as represented in the matrices forming the de-noised tensor. In some embodiments, the data processing includes accessing a tensor comprising a plurality of matrices across one or more dimensions, a matrix in the plurality of matrices representing nodes that potentially have interconnections; applying a tensor product function to the tensor to obtain a tensor graph that indicates changes in interconnections of nodes across the one or more dimensions; and outputting at least a portion of the graph.

FIG. 1 is a functional diagram illustrating a programmed computer system for performing data clustering in accordance with some embodiments. As will be apparent, other computer system architectures and configurations can be used to perform clustering. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 2, 5, 6, 7, 9, and 10.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized. For example, in various embodiments, a client-server architecture and/or a cloud-based architecture comprising multiple computer systems, virtual machines, or the like, can be used to provide the functions described below.

Figure 2:
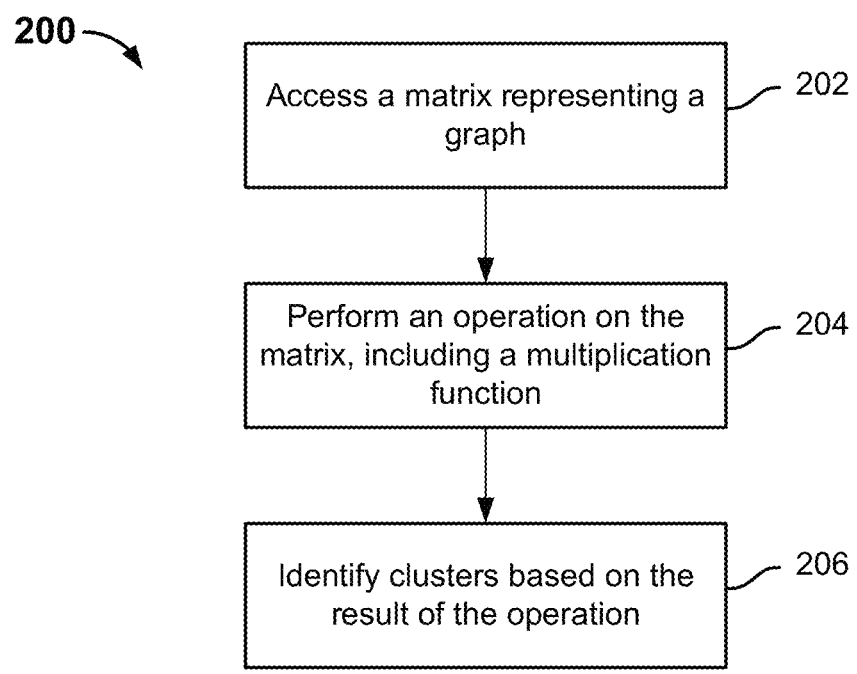
FIG. 2 is a flowchart illustrating an embodiment of a clustering process.

FIG. 2 is a flowchart illustrating an embodiment of a clustering process. Process 200 can be performed by a system such as 100.

At 202, a matrix representing a graph is accessed. In this example, a graph represents interconnected nodes to be clustered, and a matrix representing the graph can be obtained by following certain rules.

Figure 3A:
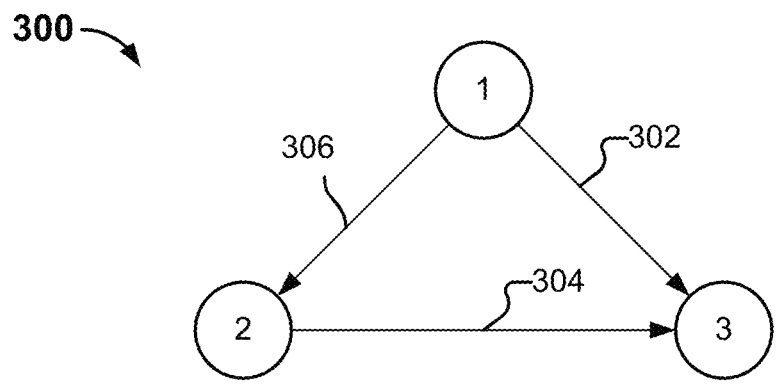
FIGS. 3A-3D are diagrams illustrating embodiments of graphs.
Figure 3B:
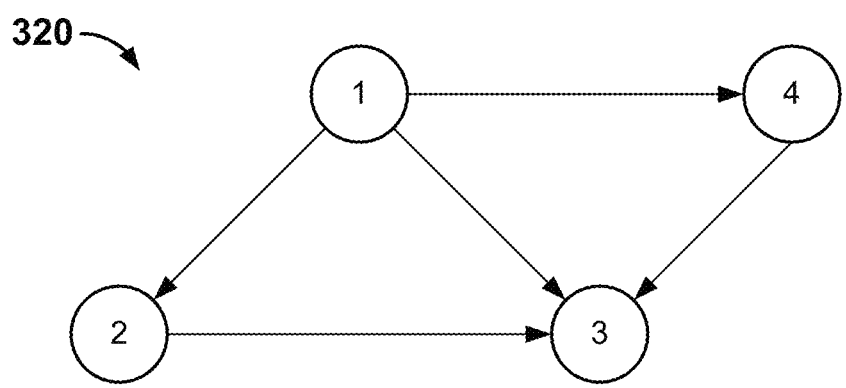
Figure 3C:
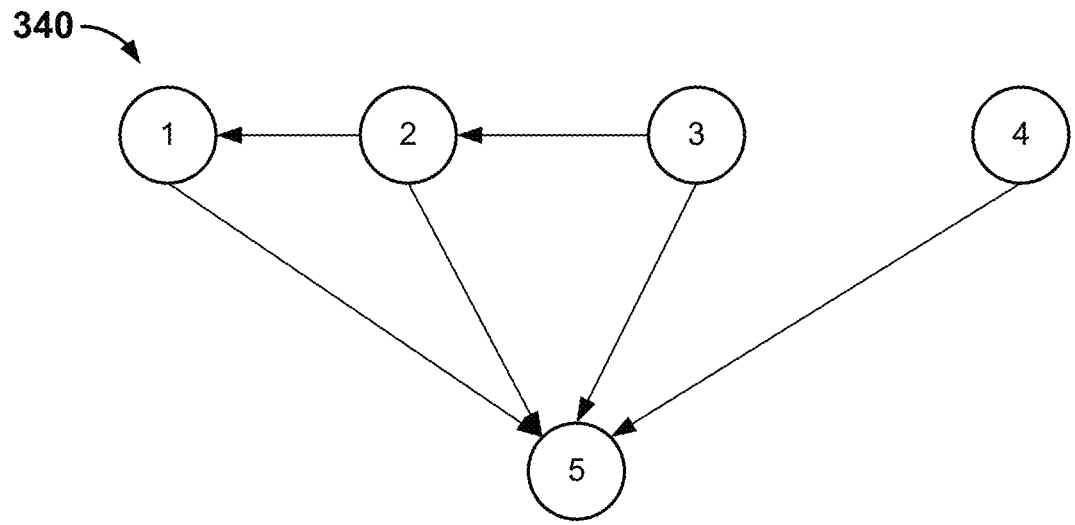
Figure 3D:
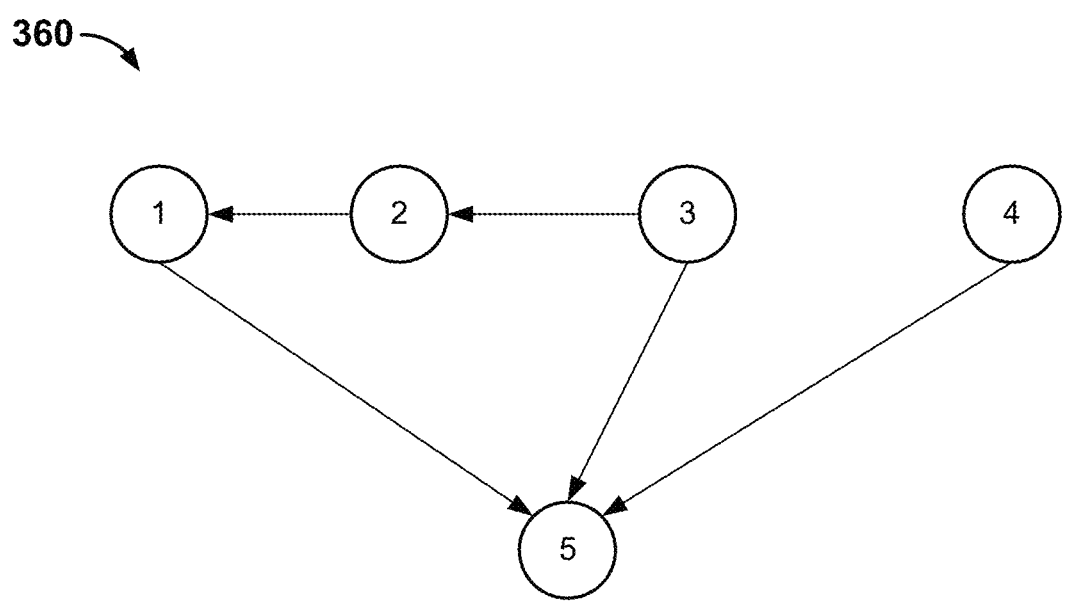

FIG. 3A is a diagram illustrating an embodiment of a graph. Graph 300 is a directed graph that is generated based on the nodes to be clustered and their associations. In this example, graph 300 includes nodes identified using identification numbers (ID) 1, 2, 3, etc., and edges such as 302, 304, 306, etc. The nodes represent objects or entities (e.g., users, organizations, places, etc.), and the edges represent the associations between nodes. Where there is an association between two nodes, an edge is formed. In this case, each edge is directional, and represents an association between a source node from which the edge originates and a destination node at which the edge terminates. In the diagram shown, the arrow representing an edge points away from the source node and towards the destination node. Another way of looking at this is that the source node is influenced by the destination node.

The construction of the graph depends on the context of the data being processed and can require some domain knowledge. For example, suppose that the nodes represent users of a social networking platform. Where a first user follows a second user, the node corresponding to the first user is a source node and the node corresponding to the second user is a destination node. As another example, the nodes represent airports, and an edge is formed between the departure airport and the arrival airport of a flight. Many other constructions are possible. For purposes of discussion, it is assumed that for two-dimensional clustering, the graphs are pre-constructed and provided to the clustering process.

The matrix M representing the graph is an N×N matrix, where N corresponds to the number of nodes. An entry at the (x, y) location in the matrix is assigned a value of 1 if there is an edge from source node x to destination node y, and is assigned a value of 0 if there is no edge from source node x to destination node y. For example, in FIG. 3A, there is an edge originating from node 1 to node 3, thus the matrix entry at (1, 3) is set to 1; and there is no edge originating from node 3 to node 1, thus the entry at (3, 1) is set to 0. Further, all entries on the diagonal of the matrix are set to 1 because each node is deemed to be self-connected (that is, having an edge originating from and ending at itself), and therefore are set to 1.

Accordingly, the matrices $M_A$, $M_B$, $M_C$, and $M_D$ representing example graphs 300, 320, 340, and 360 of FIGS. 3A-3D, respectively, are:

$$M_A = \begin{bmatrix} 1 & 1 & 1 \\ 0 & 1 & 1 \\ 0 & 0 & 1 \end{bmatrix}; M_B = \begin{bmatrix} 1 & 1 & 1 & 1 \\ 0 & 1 & 1 & 0 \\ 0 & 0 & 1 & 0 \\ 0 & 0 & 1 & 1 \end{bmatrix};$$

$$M_C = \begin{bmatrix} 1 & 0 & 0 & 0 & 1 \\ 1 & 1 & 0 & 0 & 1 \\ 0 & 1 & 1 & 0 & 1 \\ 0 & 0 & 0 & 1 & 1 \\ 0 & 0 & 0 & 0 & 1 \end{bmatrix}; \text{ and}$$

$$M_D = \begin{bmatrix} 1 & 0 & 0 & 0 & 1 \\ 1 & 1 & 0 & 0 & 0 \\ 0 & 1 & 1 & 0 & 1 \\ 0 & 0 & 0 & 1 & 1 \\ 0 & 0 & 0 & 0 & 1 \end{bmatrix}.$$

As described herein, two edges originating from two separate source nodes and terminating at the same destination node, and one or more edges connecting the source nodes (referred to as the base) form a vertex of a triangle at the destination node. A node at which a large number of vertices are formed is deemed to be more influential relative to other nodes having fewer vertices. For example, a user on a social network who has a large number of followers or a seller on an e-commerce platform who has a lot of customers would be deemed influential, and this information is useful for clustering. In the example shown, the graph also has self-connectivity. In other words, the graph can include self-connected nodes (i.e., each node is connected to itself). For example, in a graph representing users of a social networking platform, each user is represented as a node in the graph that is self-connected. This is because each node is deemed to be influential to itself.

Returning to FIG. 2, at 204, an operation is performed on the matrix. In this example, the operation includes one or more multiplication functions on the matrix.

In one example, the operation (OP) corresponds to squaring the matrix:

$$OP = M^2 \qquad (1)$$

Accordingly, with example graphs 300-360, the results of the squaring operations are:

$$OP_A = M_A^2 = \begin{bmatrix} 1 & 2 & 3 \\ 0 & 1 & 2 \\ 0 & 0 & 1 \end{bmatrix}; OP_B = M_B^2 = \begin{bmatrix} 1 & 2 & 4 & 2 \\ 0 & 1 & 2 & 0 \\ 0 & 0 & 1 & 0 \\ 0 & 0 & 2 & 1 \end{bmatrix};$$

$$OP_C = M_C^2 = \begin{bmatrix} 1 & 0 & 0 & 0 & 2 \\ 2 & 1 & 0 & 0 & 3 \\ 1 & 2 & 1 & 0 & 3 \\ 0 & 0 & 0 & 1 & 2 \\ 0 & 0 & 0 & 0 & 1 \end{bmatrix}; \text{ and}$$

$$OP_D = M_D^2 = \begin{bmatrix} 1 & 0 & 0 & 0 & 2 \\ 2 & 1 & 0 & 0 & 1 \\ 1 & 2 & 1 & 0 & 2 \\ 0 & 0 & 0 & 1 & 2 \\ 0 & 0 & 0 & 0 & 1 \end{bmatrix}.$$

At 206, clusters are identified based on the result matrix of the operation. In this example, one or more vertices are detected based on the result matrix, and clusters are formed in connection with the vertices. Specifically, an entry corresponding to a value v that at least meets a threshold is deemed to correspond to a vertex of a triangle in the graph. The column index of the identified entry corresponds to the identification number of the vertex node (also referred to as an influential node). The clustering results can be sent to a display, to another analytical application such as a predictive tool to be further processed and/or displayed, or the like.

For the examples of FIGS. 3A-3D, the threshold is set to 3. Other values can be determined empirically for different sized matrices or matrices with different weights.

In the result of $M_A^2$, entry (1, 3) of the result matrix meets the threshold; therefore, node 3 is deemed to be a vertex node. Further, the number of vertex/vertices at this node is determined to be (value-2). In other words, (value-2) indicates the number of triangles for which this node acts as a vertex/vertices. Thus, at node 3, there is (3–2)=1 vertex. In the original matrix, non-zero entries located on the same column as the vertex entry correspond to nodes connected to the vertex. These non-zero entries can be identified by inspection. These connected nodes form a cluster. In this case, the non-zero entries in $M_A$ are (1, 3), (2, 3), and (3, 3). Since (3, 3) indicates a self-connection, nodes 1 and 2 are deemed to be connected to (and in the same cluster as) node 3.

In the result of $M_B^2$, entry (1, 3) meets the threshold; therefore, node 3 is deemed to be a vertex node, and nodes 1, 2, and 4 are deemed to be connected to (and in the same cluster as) node 3. Since entry (1, 3) has a value of 4 and 4–2=2, it indicates that there are two vertices at node 3 (in other words, node 3 acts as vertices for two triangles).

In the result of $M_C^2$, entries (2, 5) and (3, 5) meet the threshold; therefore, node 5 is deemed to be a vertex node. By inspecting $M_C$, nodes 1, 2, and 3 are deemed to be connected to (and in the same cluster as) node 5, and since (3–2=1), node 5 acts as a vertex for a triangle with respect to node 2, and acts as a vertex for another triangle with respect to node 3. Note that while node 4 connects to node 5, because node 4 does not form a triangle with node 5 and entry (4, 5) does not meet the threshold, the connection is deemed to be a weak one and node 4 is not included in the same cluster as node 5.

In the result of $M_D^2$, no entry meets the threshold. This is because there is no first order triangle (that is, a triangle with a base comprising a single edge) in graph 360. A different operation can be performed to identify vertices formed by second order triangles (that is, a triangle with a base comprising two connected edges). In this case, $$OP = M^3 \text{ Accordingly, } OP_D = M_D^3 = \begin{bmatrix} 1 & 0 & 0 & 0 & 3 \\ 3 & 1 & 0 & 0 & 3 \\ 3 & 3 & 1 & 0 & 4 \\ 0 & 0 & 0 & 1 & 3 \\ 0 & 0 & 0 & 0 & 1 \end{bmatrix} \quad (2)$$

In this example, a threshold of 4 is used to identify the vertex. Entry (3, 5) meets this threshold, indicating that node 5 is a vertex for a triangle. In this example, according to the graph, node 5 has 2 incident edges, one originating from node 1 and another one originating from node 3, forming two sides of a triangle. The base side of the triangle includes 2 segments (from node 3 to node 2 and from node 2 to node 1).

Other operations can be used to identify the vertices. In another example, the operation is:

$$OP = M \cdot (M-I), \quad (3)$$

where I is the identity matrix. In this case, the threshold is 2. Thus, at 206, the same node determinations can be made based on the results using function (1). Accordingly, $$OP_A = M_A \cdot (M_A - I) = \begin{bmatrix} 0 & 1 & 2 \\ 0 & 0 & 1 \\ 0 & 0 & 0 \end{bmatrix}$$

$$OP_B = M_B \cdot (M_B - I) = \begin{bmatrix} 0 & 1 & 3 & 1 \\ 0 & 0 & 1 & 0 \\ 0 & 0 & 0 & 0 \\ 0 & 0 & 1 & 0 \end{bmatrix};$$

$$OP_C = M_C \cdot (M_C - I) = \begin{bmatrix} 0 & 0 & 0 & 0 & 1 \\ 1 & 0 & 0 & 0 & 2 \\ 1 & 1 & 0 & 0 & 2 \\ 0 & 0 & 0 & 0 & 1 \\ 0 & 0 & 0 & 0 & 0 \end{bmatrix}; \text{ and}$$

$$OP_D = M_D \cdot (M_D - I) = \begin{bmatrix} 0 & 0 & 0 & 0 & 1 \\ 1 & 0 & 0 & 0 & 1 \\ 1 & 1 & 0 & 0 & 1 \\ 0 & 0 & 0 & 0 & 1 \\ 0 & 0 & 0 & 0 & 0 \end{bmatrix}.$$

The results obtained using formulas (1)-(3) are consistent with the results obtained using equation (1). In other words, the same vertices are determined.

Other formulas can be used to identify vertices in other embodiments. For example, the following general formula can be used to identify j-th order vertices and clusters:

$$OP = M \cdot (M-I)^j \quad (4)$$

where j=1, 2, 3, etc. The j-th order vertices correspond to vertices at base-j triangles (e.g., triangles whose bases are formed by j edge segments), and are helpful for identifying nodes that are influential to the j-th degree.

Although 0 or 1 are assigned to the entries in the matrices discussed in the above examples, in some embodiments, an edge can be assigned a weighted value other than 0 or 1 to indicate the degree of association between the source node and the destination node. For example, a weight of 0.5 indicates a lesser degree of association than a weight of 2.6. Process 200 can still be used to identify the influential nodes and the threshold value used to detect the vertices can be an empirically determined value. In some embodiments, instead of using a threshold to identify the vertices in 206, entries with the highest values (e.g., the top five entries) are selected as corresponding to vertices.

In some embodiments, the graph includes one or more edges that correspond to negative values, indicating that there are negative associations between certain source nodes and certain destination nodes, for example, when certain source users indicate dislike or disapproval of certain target users. In such cases, process 200 can be used to conduct friend/foe analysis to identify unfriendly clusters and/or friendly clusters. As used herein, a friendly cluster includes nodes that are friendly towards (or are positively influenced by) an influential node of the cluster, and an unfriendly cluster (also referred to as a foe cluster) includes nodes that are unfriendly towards (or are negatively influenced by) an influential node of the cluster.

At 202, a matrix representing the graph is accessed. Here, the graph includes one or more negative edges indicating negative associations between certain nodes and therefore the matrix includes one or more entries.

At 204, an operation that includes a multiplication operation on the matrix is performed. Operations such as (1) or (2) can be performed to obtain the main vertices and identify the main clusters, (3) can be performed to obtain the secondary vertices and identify the secondary clusters, (4) can be performed to obtain the tertiary vertices and identify the tertiary clusters, etc.

At 206, the clusters are identified based on the result of 204. In this case, a negative threshold (e.g., −2 for an initial matrix that has entry values of 1 or −1) is used to identify unfriendly clusters (also referred to as the foe clusters). The value of the negative threshold is empirically determined and can vary for edges having weighted values. Specifically, in some embodiments, an entry of the result of 204 that exceeds (e.g., is less than or equal to) the negative threshold value is deemed to correspond to an influential node, and the nodes connecting to the determined influential node form a foe cluster. In some embodiments, one or more most negative entries (e.g., the bottom five most negative entries) in the matrix in the result are selected as the most influential node.

Additional inferences can be made based on the identified foe clusters to further process the nodes. For example, suppose that several unconnected nodes are all found to be in a foe cluster with respect to a particular influential node, a further inference can be drawn that these disconnected nodes are deemed to be friendly to each other and therefore are clustered into a friendly cluster together.

In some embodiments, two thresholds, one positive and one negative, are used to identify friendly clusters and unfriendly clusters, respectively. The values of the thresholds are empirically determined and can vary for different embodiments (e.g., 3 and −2). An entry that exceeds (e.g., is greater than or equal to) the positive threshold has positive influence on the nodes connecting to it (in other words, the nodes form a friendly cluster). An entry that exceeds the negative threshold has negative influence on the nodes connecting to it (in other words, these nodes form an unfriendly cluster).

Multi-Variate and Multi-Dimensional Clustering

In the above discussion, the clustering is performed on multiple nodes (or equivalently, variables or variates) organized in a 2-dimensional matrix. In many situations the nodes influence each other across multiple dimensions. In one example, the nodes represent consumers and brands of products they purchase. The dimensions can be temperature, unemployment rate, exchange rate, etc., all of which can influence purchasing behaviors of the consumers. As another example, the nodes represent airports, and the dimensions can be delays, time of the day, days of the week, etc. Historical data can be recorded and matrices representing nodes and their interconnections are formed across various dimensions. How to construct the matrices often requires domain knowledge and depends on the data being analyzed. As will be described in greater detail below, data recorded as multi-variate and multi-dimensional matrices is input to a clustering process to be clustered. The clustering process removes noise and establishes more clear linkages between nodes across multiple dimensions. In particular, the multi-variate and multi-dimensional clustering process determines the effects of one or more varying dimensions on the clusters. For example, how sensitive are people's purchasing behaviors to changes in temperature, unemployment range, exchange rate, etc., change; how do airports affect each other in terms of delays with changes in time of the day, day of the week, etc.

As used herein, a 1-dimensional matrix (an array) is referred to as a vector; a 2-dimensional matrix is referred to simply as a matrix; a 3-dimensional or higher matrix is referred to as a tensor. In a tensor, one or more axes represent the variables (also referred to as variates), and other axes represent the dimensions over which the variates admit moments or rates of change. For purposes of illustration, 3-dimensional tensors are discussed in the examples below. The techniques described also apply to tensors of four or more dimensions.

Figure 4:
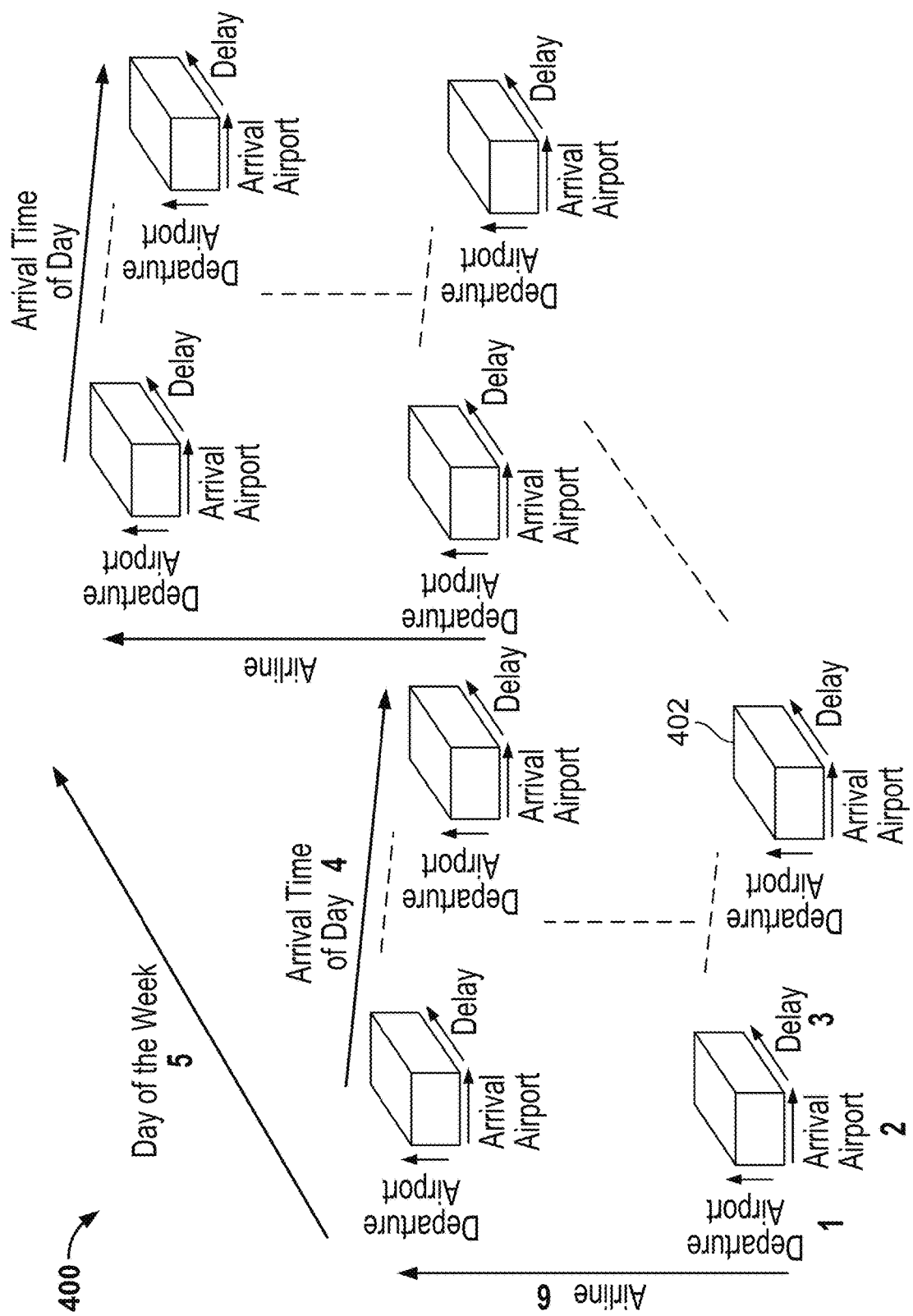
FIG. 4 is a diagram illustrating a visualization of a multi-dimensional tensor example relating to airport delays.

In the examples below, it is assumed that a tensor comprising 2-dimensional matrices across one or more dimensions (e.g., across the $3^{rd}$ or higher dimensions) has been constructed and is to be processed. FIG. 4 is a diagram illustrating a visualization of a multi-dimensional tensor example relating to airport delays. In this example, 2-dimensional matrices are formed according to the dimensions of departure airports and arrival airports. A third dimension corresponds to the amount of delays, and a 3-dimensional tensor can be constructed as stacking multiple 2-dimensional matrices across the third dimension. A fourth dimension corresponds to arrival time of the day, and a 4-dimensional tensor can be constructed as multiple 3-dimensional tensors stacked across the fourth dimension. The fifth dimension corresponds to day of the week, the sixth dimension corresponds to airline, and a 5-dimensional tensor can be constructed as multiple 4-dimensional tensors stacked across the fourth dimension, and so on. As will be shown in greater detail below, the 3-dimensional tensors can be processed using efficient clustering techniques. Thus, tensors of four dimensions or higher can be processed similarly by processing the 3-dimensional tensors that form the higher dimensional tensors.

Generally, an N-dimensional tensor (N being an integer greater than 2) can be constructed by stacking a set of (N−1)-dimensional tensors along the N-th dimension, or equivalently, by stacking matrices along multiple dimensions. Data can be collected over a period of time (e.g., several months) and put into bins based on the corresponding dimensions (e.g., delay of 0 hours, delay of 0.5 hours, delay of 1 hour, etc., arriving between 9 am-noon, noon-3 pm, 3 pm-6 pm, etc., on Monday, Tuesday, Wednesday, etc.) to construct the tensor to be processed.

Figure 5:
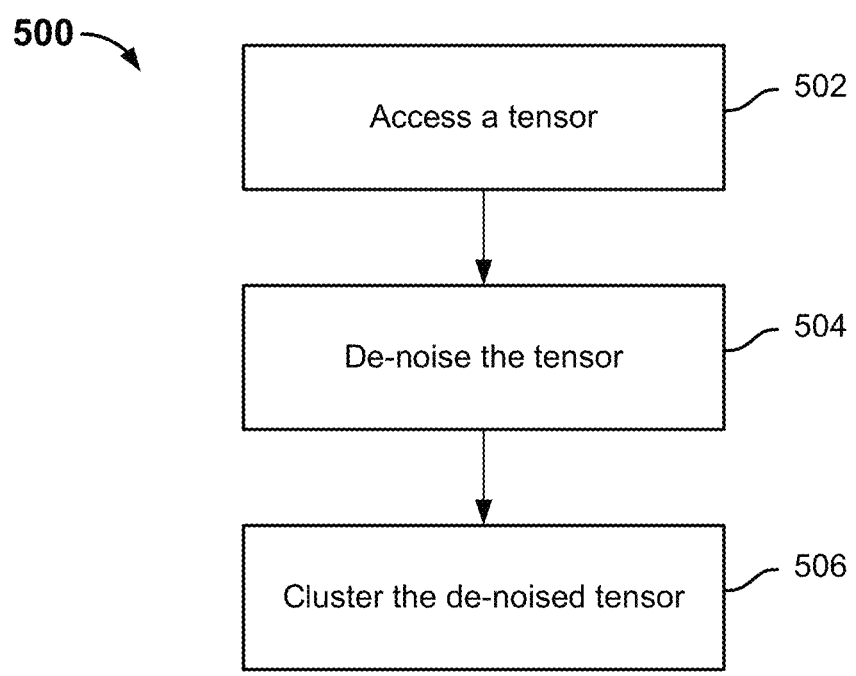
FIG. 5 is a flowchart illustrating an embodiment of a multi-dimensional data processing process.

FIG. 5 is a flowchart illustrating an embodiment of a multi-dimensional data processing process. Process 500 can be performed by a system such as 100.

At 502, a tensor is accessed. As discussed above, the tensor is a multi-dimensional matrix representing the raw data to be clustered. The raw data can be collected and stored separately from process 500. At this point, the tensor is said to be in a "native domain." An identifier, pointer, handle, reference, or the like to a storage or memory location of the tensor can be used to access the tensor and obtain values of its entries.

In this process, the tensor is deemed to have noise. Thus, at 504, the tensor is de-noised to generate a de-noised tensor. As will be described in greater detail below in connection with FIG. 7, the de-noising includes transforming the original tensor to the Fourier domain using Fourier transform, performing an N-dimensional spectral reduction (or equivalently, an SVD in the Fourier domain), then performing an inverse Fourier transform to return to the native domain. The de-noised tensor has the same dimensions as the original tensor accessed at 502.

At 506, the de-noised tensor is clustered. As will be described in greater detail below in connection with FIG. 9, the clustering includes applying a tensor product function to the de-noised tensor. The tensor product function can be a convolution, or a multiplication in the Fourier domain converted back to the native domain. The result is a de-noised, clustered tensor having the same dimensions as the original tensor.

Figure 6:
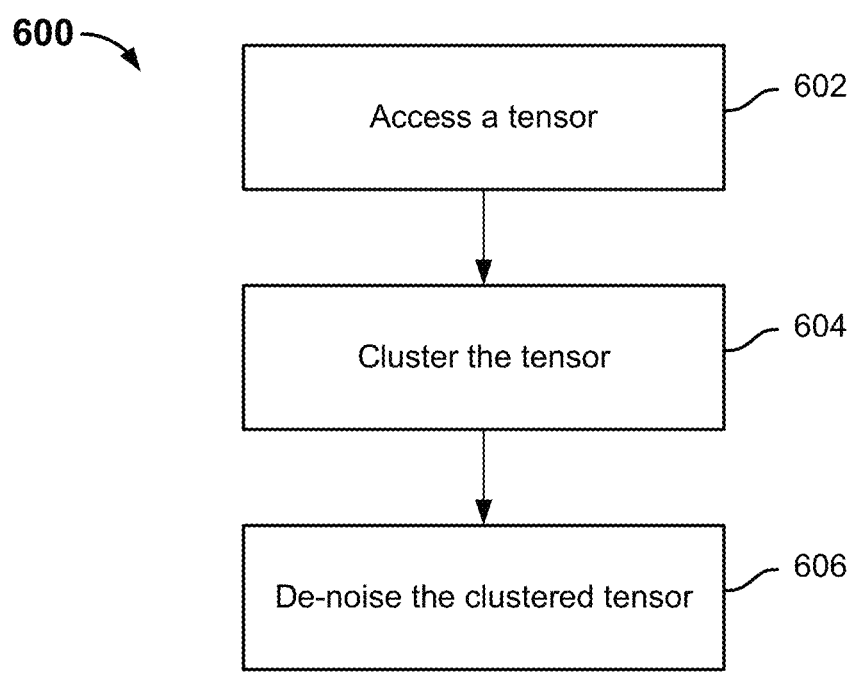
FIG. 6 is a flowchart illustrating another embodiment of a multi-dimensional data processing process.

FIG. 6 is a flowchart illustrating another embodiment of a multi-dimensional data processing process. Process 600 can be performed by a system such as 100.

At 602, the tensor is accessed. As discussed above, the tensor is a multi-dimensional matrix representing the raw data in the native domain. An identifier, pointer, handle, reference, or the like to a storage or memory location of the tensor can be used to access the tensor and obtain values of its entries.

In this process, the interconnections of nodes represented by the tensor are to be preserved as much as possible. Thus, any cleanup (de-noising) of data is to occur after the clustering. At 604, the tensor is clustered to generate a clustered result. Details of the clustering are described below in connection with FIG. 9. The clustering of the tensor includes applying a tensor product to the tensor. In some embodiments, the tensor product operation includes convolution; in some embodiments, the tensor product operation includes transforming the tensor to the Fourier domain, multiplying the transformed result with its transpose, then inverse transforming the multiplication result back into the native domain. The clustered result is a tensor having the same dimensions as the original tensor accessed at 602.

At 606, the clustered result is de-noised. Details of the de-noising are described below in connection with FIG. 7. The result is a clustered, de-noised tensor having the same dimensions as the original tensor.

While both processes 500 and 600 provide ways for clustering data and establishing linkages across multiple dimensions, they perform de-noising and clustering in different orders. When raw data is relatively noisy and filtering out the noise would not significantly impact the type of linkages/clusters being sought, process 500 is selected. For example, suppose that the clusters to be established pertain to people's purchasing behavior towards certain consumer product brands, and the raw data also includes various information deemed irrelevant towards this end (e.g., if a consumer makes a purchase of a particular brand of product once every ten years, but makes purchases of a different brand of the same type of product on a monthly basis, the first purchase may be deemed irrelevant in one clustering process). Process 500 is preferably used to de-noise the data first to filter out the irrelevant information, and allow the clustering to be performed more efficiently and to provide a cleaner result. As another example, suppose that the clusters to be established pertain to the prices of a set of stocks, and it is initially unclear how different factors in the raw data influence the stock prices. Process 600 is preferably used to cluster the data first so as to preserve the inter-connections between nodes as much as possible and provide a more accurate result. Further, in some embodiments, the raw data can be de-noised, clustered, then de-noised again.

Figure 7:
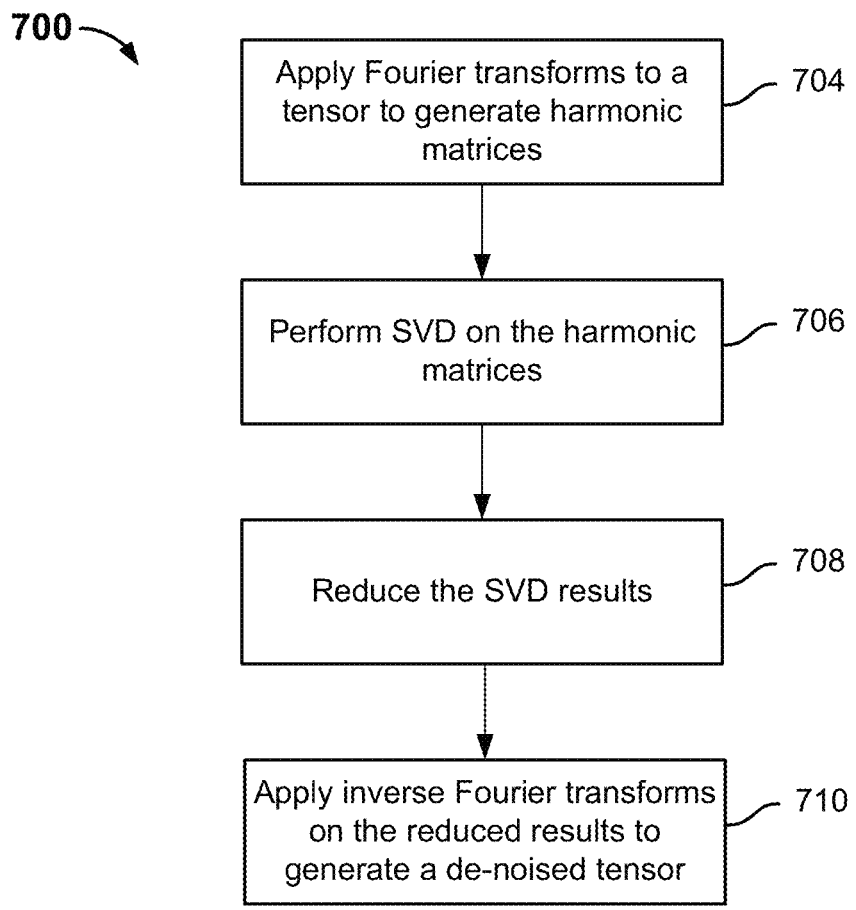
FIG. 7 is a flowchart illustrating an embodiment of a tensor de-noising process.

FIG. 7 is a flowchart illustrating an embodiment of a tensor de-noising process. FIGS. 8A-8D are diagrams illustrating an example tensor and the intermediate results as it is de-noised. Process 700 is explained in connection with 8A-8D for purposes of example.

Process 700 can be used to implement, for example, 504 of process 500 or 606 of process 600 (in which case the input tensor would be the clustered tensor resulting from 604). Depending on the context in which 700 is invoked, the initial tensor to be processed by flow 700 can correspond to raw data (e.g., the original tensor accessed by 502 of process 500) or clustered data (e.g., the clustered result generated by 604 of process 600).

Figure 8A:
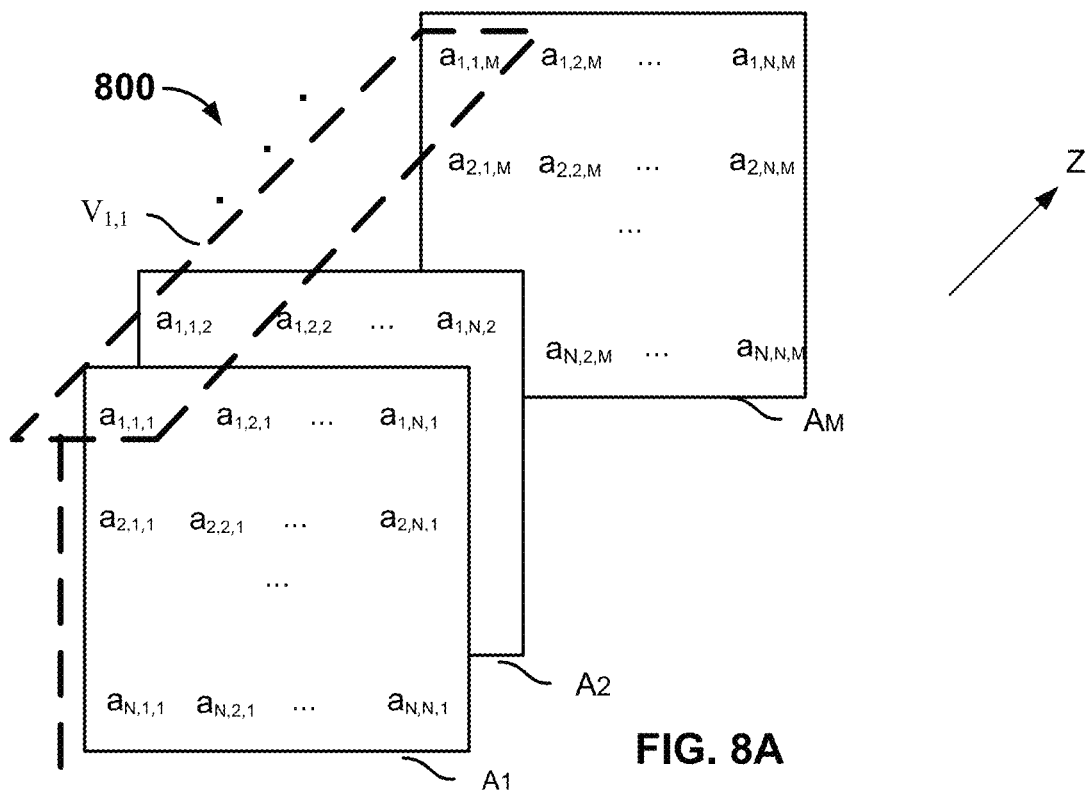
FIGS. 8A-8D are diagrams illustrating an example tensor and the intermediate results as it is de-noised.

The tensor to be processed includes multiple matrices and forms a plurality of vectors across one or more dimensions. FIG. 8A illustrates a 3-dimensional tensor example. In this example, tensor 800 includes M N×N matrices such as $A_1$, $A_2$, ... $A_M$, etc. (M and N are integers) across a dimension along the Z-axis. To facilitate subsequent processing, entries at the same corresponding locations in the matrices are grouped across the dimension Z into vectors. For example, entries at location (1, 1) of the matrices are grouped to form a vector $V_{1,1} = (a_{1,1,1}, a_{1,1,2}, \ldots a_{1,1,M})$.

Entries at location (1, 2) of the matrices are grouped to form a vector $V_{1,2} = (a_{1,2,1}, a_{1,2,2}, \ldots a_{1,2,M})$.

Entries at location (i, j) of the matrices are grouped to form a vector $V_{i,j} = (a_{i,j,1}, a_{i,j,2}, \ldots a_{i,j,M})$, and so on.

Subsequent processing of the vectors allows for faster computation and reduces memory requirement in comparison to traditional clustering techniques.

Returning to FIG. 7, at 704, Fourier Transform is applied to the tensor to obtain a plurality of harmonic matrices in the Fourier domain. Specifically, discrete Fourier transform operations such as Fast Fourier Transform (FFT) are applied to the vectors in the tensor (e.g., $V_{1,1}$, $V_{1,2}$, ..., etc.) to obtain a plurality of corresponding transformed vectors in the Fourier domain. Examples of FFT techniques include Cooley-Tukey FFT, Prime-Factor FFT, and Rader's FFT. Any other appropriate discrete Fourier transform technique can be used.

Each transformed vector generated by the FFT will also have M entries. In other words:

FFT $(V_{i,j}) = V'_{i,j} = (a'_{i,j,1}, a'_{i,j,2}, \ldots, a'_{i,j,M})$ where i=1, 2, ... N, j=1, 2, ..., N, $V'_{i,j}$ is the transformed vector and $a'_{i,j,1}, a'_{i,j,2}, \ldots, a'_{i,j,M}$ are entries of the transformed vector. The entries are also referred to as the signal components or harmonics. In particular, $a'_{i,j,1}$ is referred to as a fundamental or base component, $a'_{i,j,2}$ is referred to as the first harmonic, $a'_{i,j,k}$ is referred to as the (k-1)th harmonic, etc. The transformed vectors are arranged to form a new set of M N×N harmonic matrices ($A'_1, A'_2, \ldots A'_M$) where the harmonics of the same order form corresponding harmonic matrices. Since the vectors can undergo FFT independently, the FFT processing can be done in parallel (e.g., carried out contemporaneously on multiple processors or processor cores), thus greatly improving the processing speed.

Figure 8B:
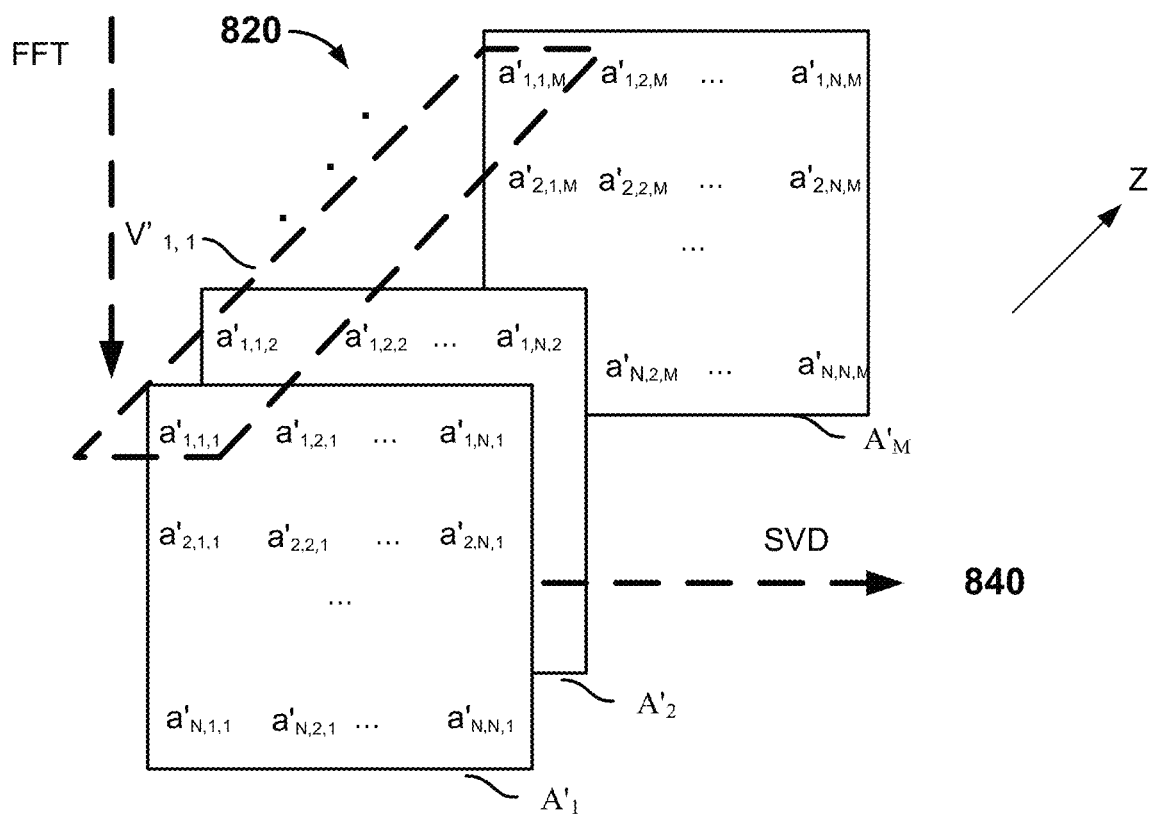

As shown in FIG. 8B, the entries are indexed according to their positions in tensor 820. For example, $a'_{i,j,k}$ is located in the i-th row and j-th column of the k-th harmonic matrix $A'_k$. The set of base entries $a'_{1,1,1}, \ldots a'_{1,N,1}, \ldots, a'_{N,N,1}, \ldots, a'_{N,N,1}$, etc. collectively forms the base or fundamental harmonic matrix $A'_1$; the set of first harmonic entries $\alpha'_{1,1,2}, \ldots \alpha'_{1,N,2} \ldots \alpha'_{N,1,2}, \ldots, \alpha'_{N,N,2}$, etc. collectively forms the first harmonic matrix $A'_2$, and so on.

To facilitate understanding, the tensor transformation is explained by making comparisons to traditional signal processing techniques. In traditional signal processing, an original signal in the time domain contains certain frequency components which are difficult to discern in the time domain. Fourier Transform transforms the original signal into the frequency domain, making the spectral components more distinct and often easier to process from a frequency stand point. In process 700, prior to the FFT, the original matrices have certain spectral components in the native domain (akin to signals in the time domain having frequency components). In the native domain, the spectral components and their relationships are hard to discern. Transforming the original matrices into the Fourier domain makes the spectral components and their relationships clearer and easier to process. For instance, $A'_1$ corresponds to the fundamental spectral component, $A'_2$ corresponds to the secondary spectral component, $A'_k$ corresponds to the k-th spectral component, etc.

Figure 8C:
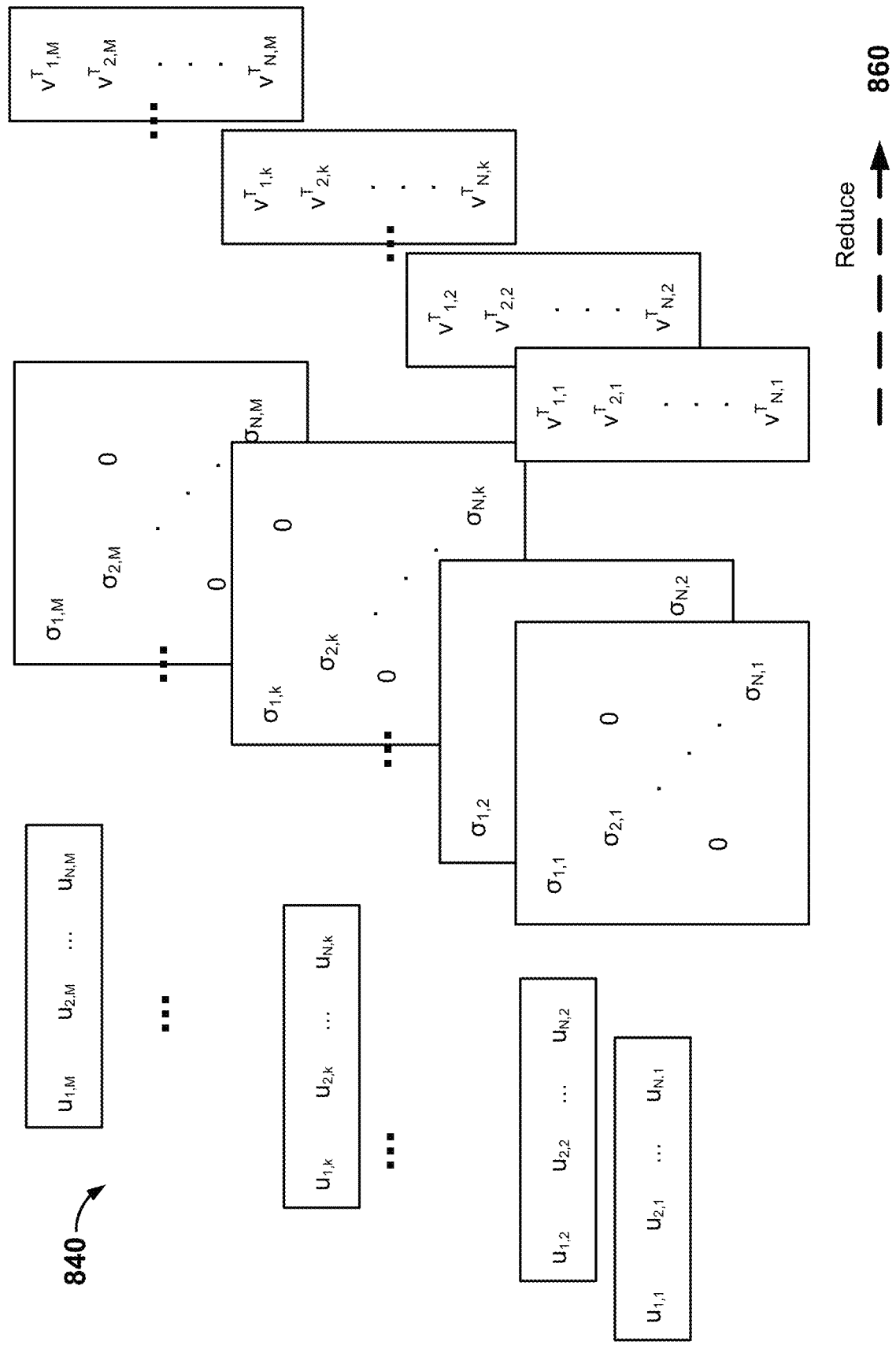

At 706, Singular Value Decompositions (SVD) is performed on the harmonic matrices to obtain a plurality of corresponding SVD results. SVD computational techniques such as reducing the matrix to a bidiagonal matrix then computing the eigenvalues or any other appropriate SVD computational techniques known to those skilled in the art can be applied. According to the standard formula for SVD, a harmonic matrix $A'_k$ is decomposed into the following form:

$$SVD(A'_k) = [u_{1,k}, u_{2,k}, \ldots u_{N,k}] \begin{bmatrix} \sigma_{1,k} & & \\ & \sigma_{2,k} & 0 \\ & 0 & \ddots \\ & & & \sigma_{N,k} \end{bmatrix} \begin{bmatrix} v^T_{1,k} \\ v^T_{2,k} \\ \ldots \\ v^T_{N,k} \end{bmatrix} =$$

$$u_{1,k}\sigma_{1,k}v^T_{1,k} + u_{2,k}\sigma_{2,k}v^T_{2,k} + \ldots + u_{N,k}\sigma_{N,k}v^T_{N,k}$$

where $\sigma_{i,k}$ is the i-th singular value, $u_{i,k}$ is the i-th left singular vector, and $v_{i,k}$ is the i-th right singular vector. The terms are preferably sorted and ordered according to the singular values, such that $\sigma_{1,k}$ is the greatest, $\sigma_{2,k}$ is the second greatest, etc. FIG. 8C illustrates the SVD results corresponding to matrices $A'_1, A'_2, \ldots, A'_k, \ldots, A'_N$ of FIG. 8B.

At 708, the SVD results are reduced. Specifically, one or more dominant components in the SVD results are selected to obtain one or more reduced results. Specifically, terms with the P highest values are selected and other terms are set to 0. The value of P is specified by the user according to the requirements of the application. For example, assuming the terms in the SVD are sorted, if P=2, the reduced expressions are:

for $SVD(A'_1)$: $u_{1,1}\sigma_{1,1}v^T_{1,1} + u_{2,1}\sigma_{2,1}v^T_{2,1}$ for $SVD(A'_2)$: $u_{1,2}\sigma_{1,2}v^T_{1,2} + u_{2,2}\sigma_{2,2}v^T_{2,2}$

...

for $SVD(A'_k)$: $u_{1,k}\sigma_{1,k}v^T_{1,k} + u_{2,k}\sigma_{2,k}v^T_{2,k}$

...

for $SVD(A'_M)$: $u_{1,M}\sigma_{1,M}v^T_{1,M} + u_{2,M}\sigma_{2,M}v^T_{2,M}$.

Figure 8D:
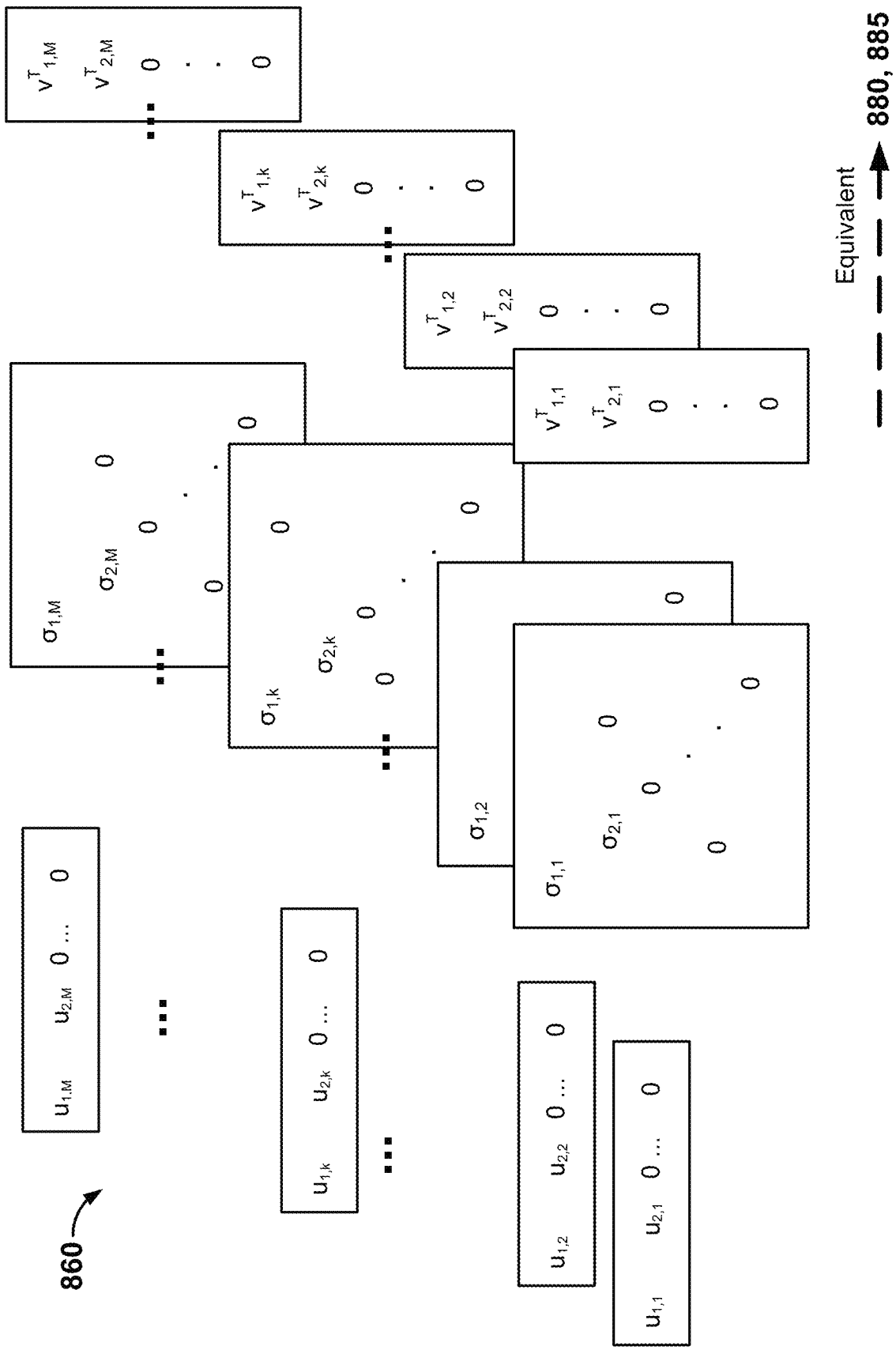

FIG. 8D illustrates the reduced SVD of FIG. 8C. In this case, the first terms combine to form a primary tensor B:

$$B = \begin{bmatrix} u_{1,1}\sigma_{1,1}v^T_{1,1} \\ u_{1,2}\sigma_{1,2}v^T_{1,2} \\ \ldots \\ u_{1,k}\sigma_{1,k}v^T_{1,k} \\ \ldots \\ u_{1,M}\sigma_{1,M}v^T_{1,M} \end{bmatrix}$$

Also, the second terms combine to form a secondary tensor C:

$$C = \begin{bmatrix} u_{2,1}\sigma_{2,1}v^T_{2,1} \\ u_{2,2}\sigma_{2,2}v^T_{2,2} \\ \ldots \\ u_{2,k}\sigma_{2,k}v^T_{2,k} \\ \ldots \\ u_{2,M}\sigma_{2,M}v^T_{2,M} \end{bmatrix}$$

Figure 8E:
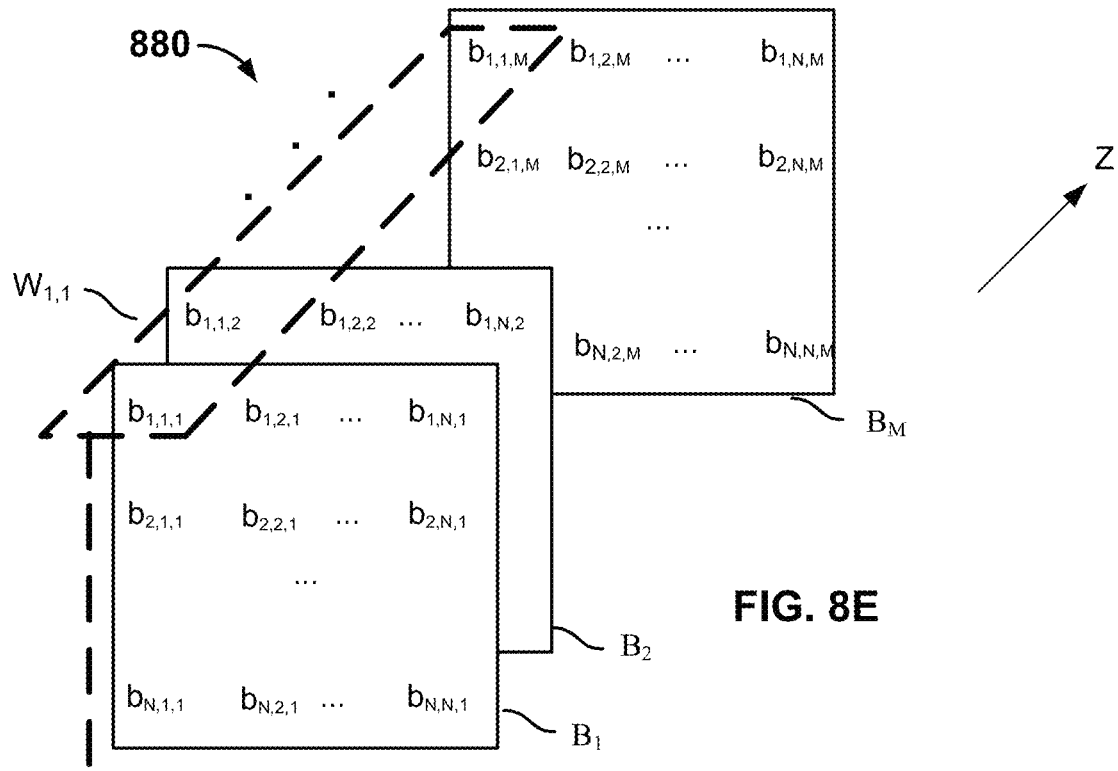
FIG. 8E illustrates the equivalent tensor of the reduced SVD for the primary tensor.

FIG. 8E illustrates the equivalent tensor of the reduced SVD for the primary tensor. As shown, tensor 880 comprises M N×N matrices.

Figure 8F:
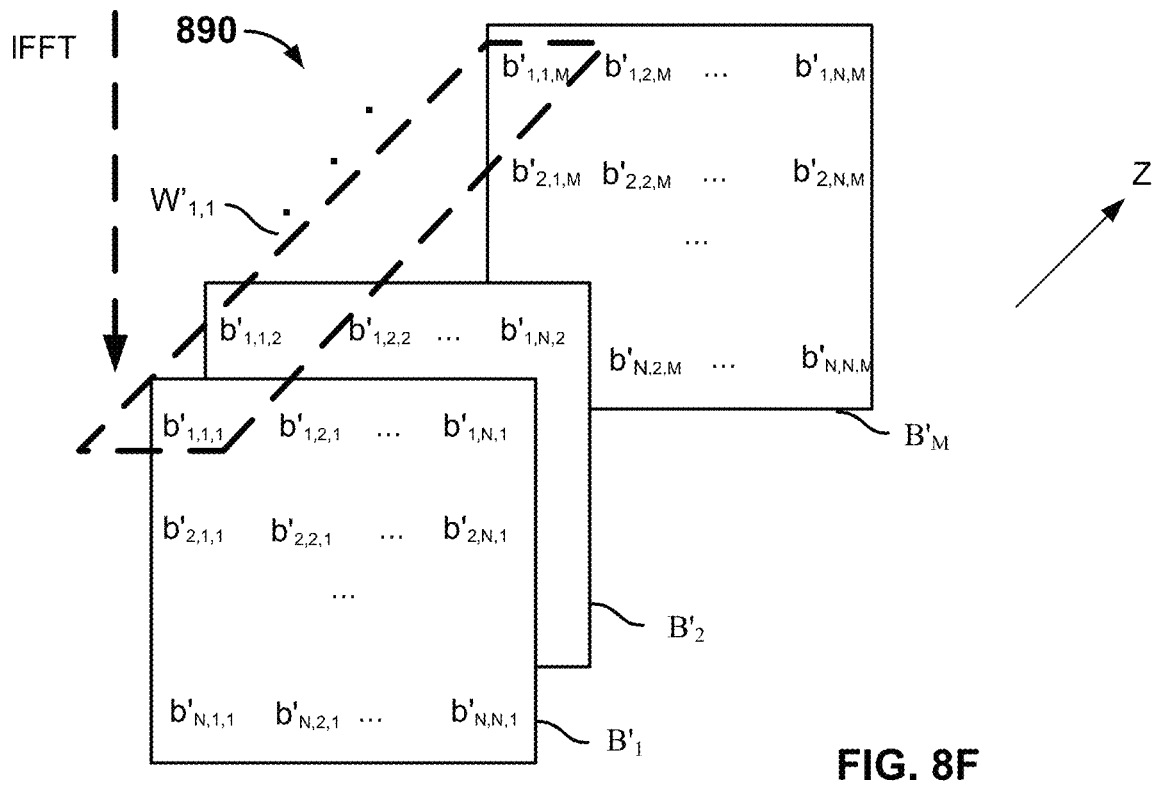
FIG. 8F shows the result of the IFFT for the primary tensor.
Figure 8G:
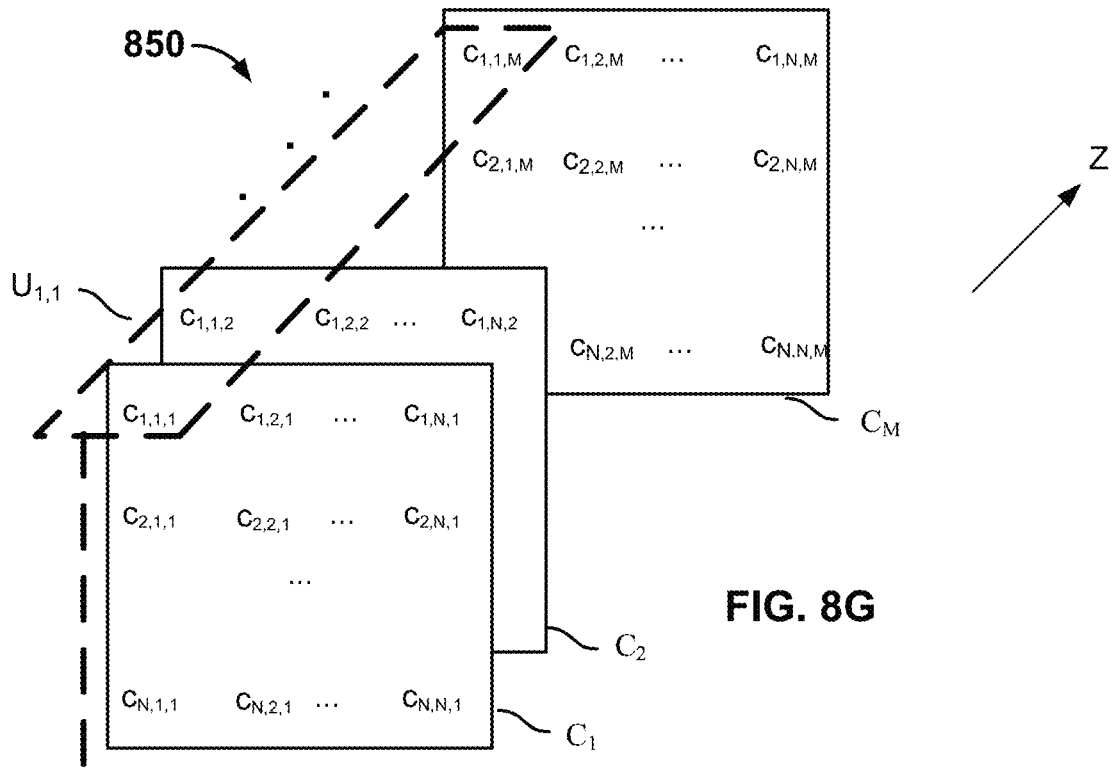
FIG. 8G illustrates the equivalent tensor of the reduced SVD for the secondary tensor.

FIG. 8G illustrates the equivalent tensor of the reduced SVD for the secondary tensor. As shown, tensor 850 also comprises M N×N matrices.

Returning to FIG. 7, at 710, inverse Fourier transforms (e.g., discrete inverse Fourier transform such as Inverse Fast Fourier Transforms (IFFT)) are performed on the reduced results to generate a de-noised tensor. Similar to the FFT process, the entries at the same corresponding locations in the matrices in each tensor are grouped to form a vector on which an IFFT is performed.

Figure 8H:
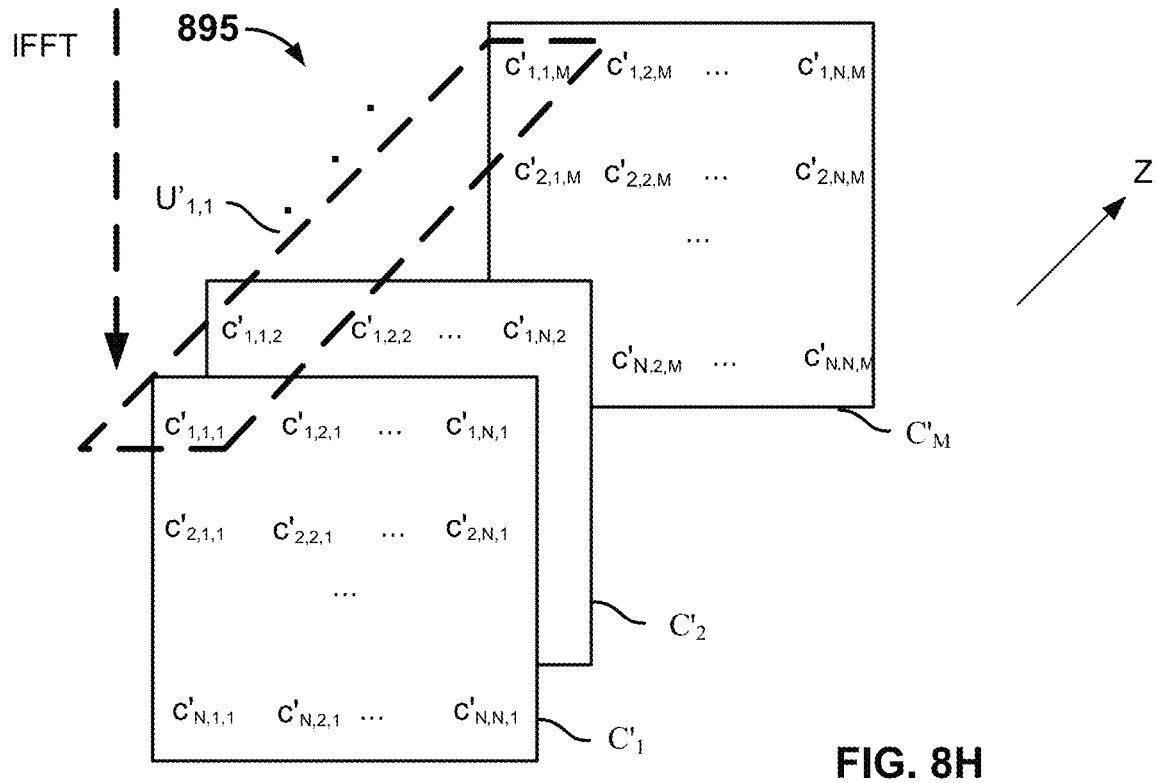
FIG. 8H shows the result of the IFFT for the secondary tensor.

Referring to FIG. 8E, the IFFT is applied to vectors such as $W_{1,1}, W_{1,2}, \ldots, W_{i,j}, \ldots$, etc. Techniques such as Cooley-Tukey IFFT, Prime-Factor IFFT, Rader's IFFT, or any other appropriate IFFT technique can be used. Entries of the IFFT result vectors (e.g., entries of vectors $W'_{1,1}, W'_{1,2}$, etc.) occupy the corresponding locations in the tensor as the corresponding entries of the input vector to the IFFT function. FIG. 8F shows the result of the IFFT for the primary tensor. Similarly, FIG. 8H shows the result of the IFFT for the secondary tensor. Tensors 890 and 895 can be output to a graphing or analysis tool, to a clustering process such as 900 described below, or the like.

Figure 8I:
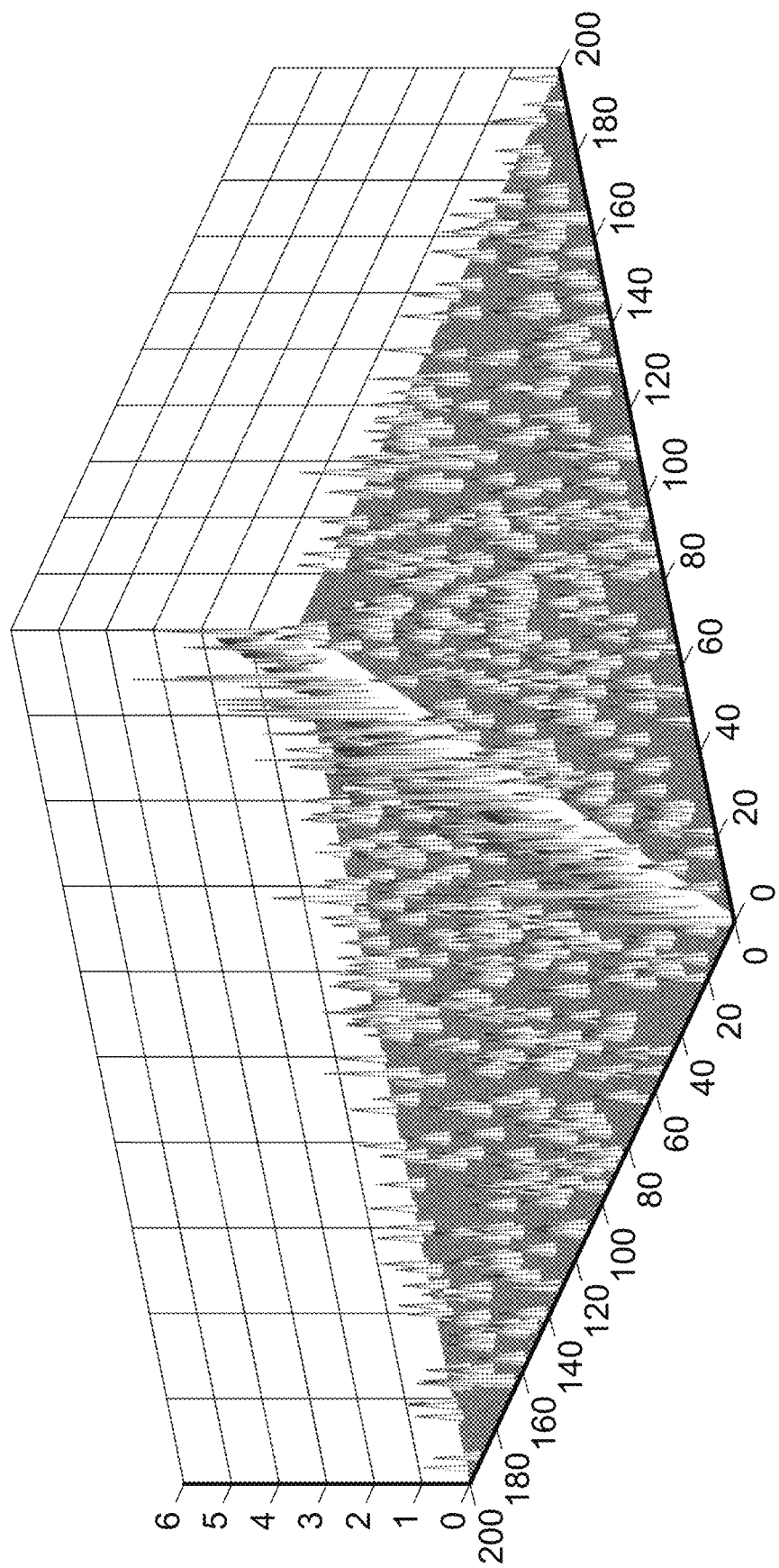
FIGS. 8I-8K are diagrams illustrating an example of a set of actual data that is de-noised using process 700.
Figure 8J:
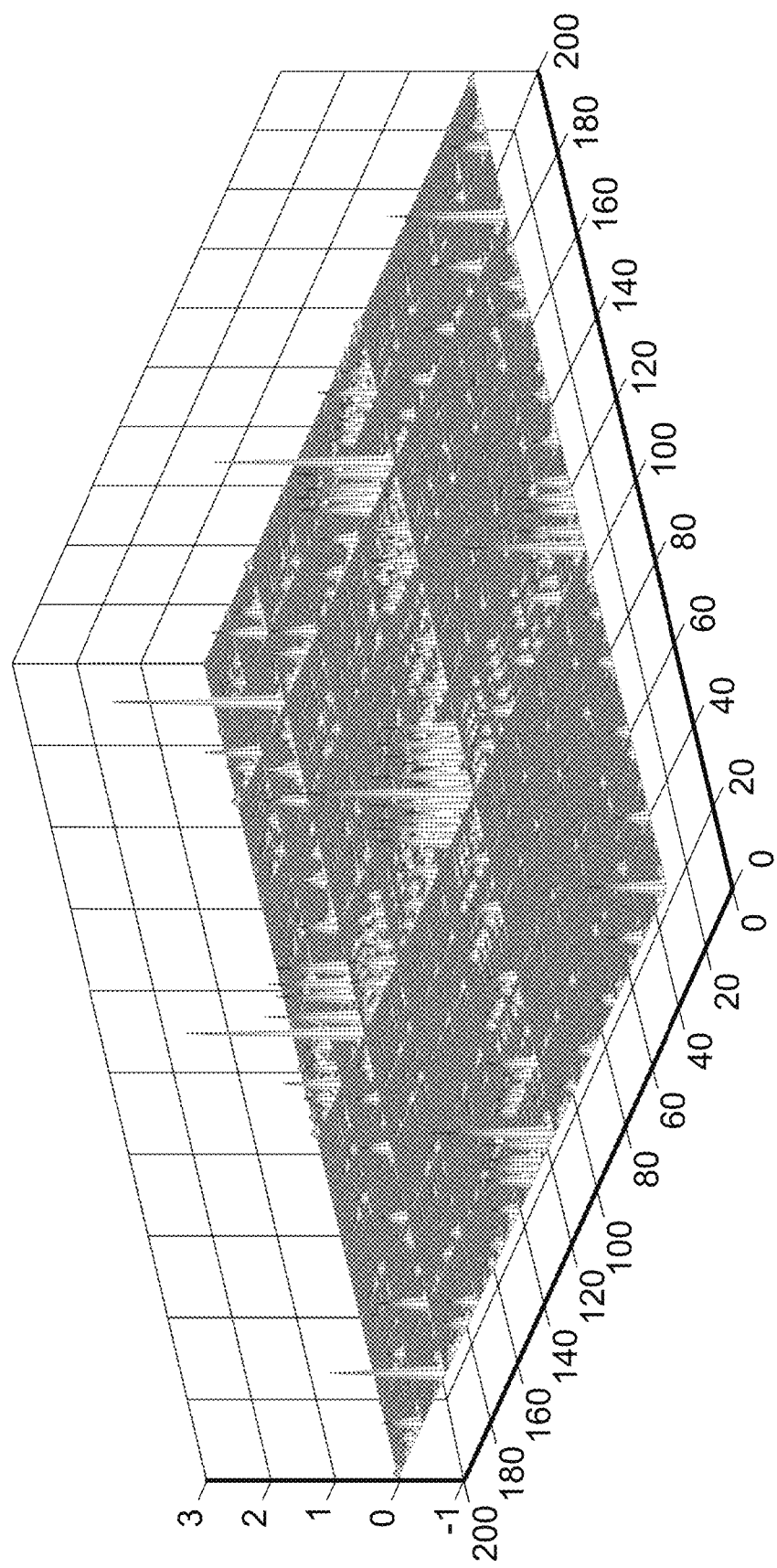
Figure 8K:
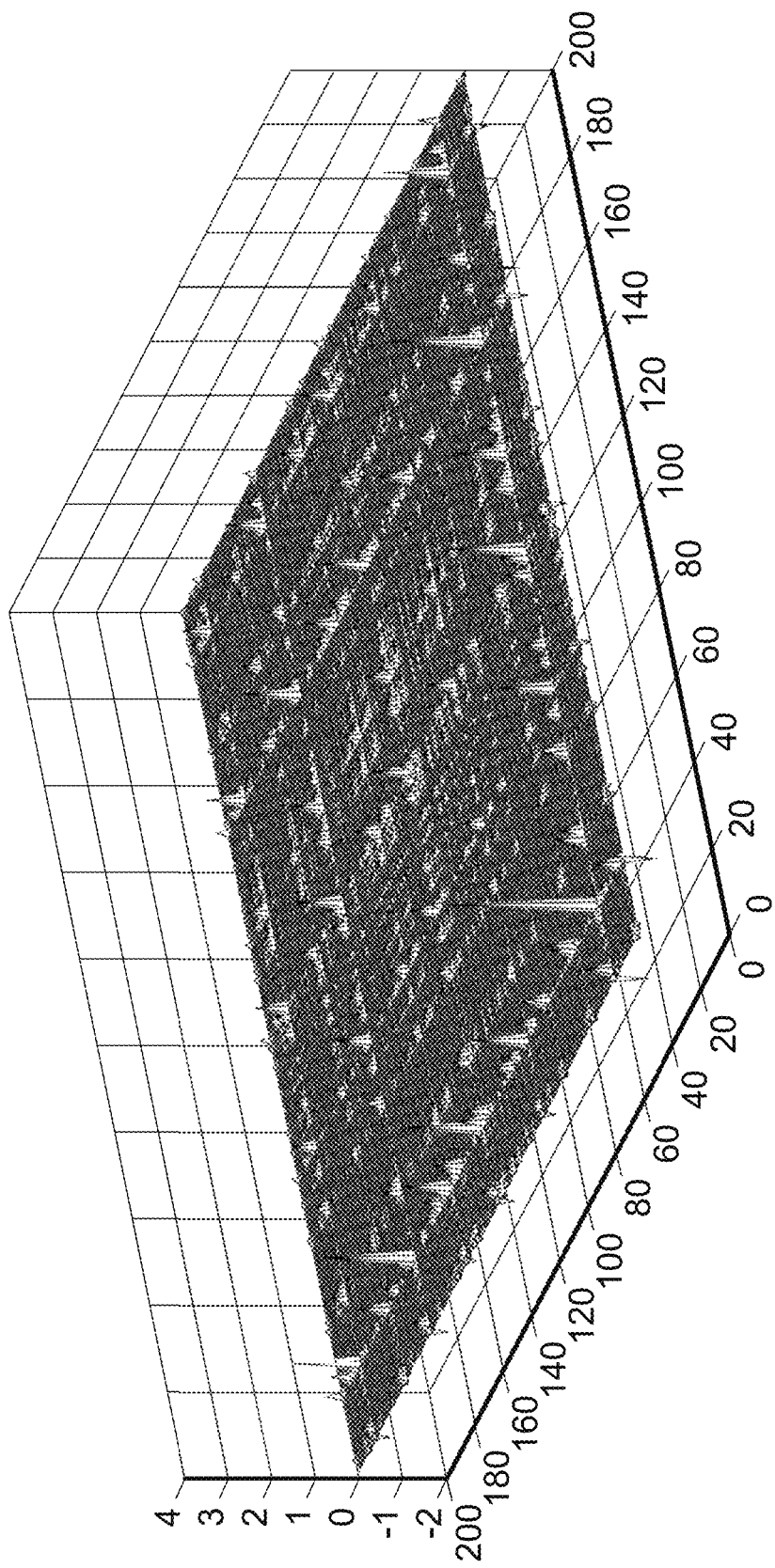

FIGS. 8I-8K are diagrams illustrating an example of a set of actual data that is de-noised using process 700. FIG. 8I illustrates the original, raw data to be processed. FIG. 8J illustrates the de-noised primary tensor. FIG. 8K illustrates the de-noised secondary tensor. As can be seen from the figures, noise from the raw data is successfully removed and the correlations between nodes are more clearly shown.

Figure 9:
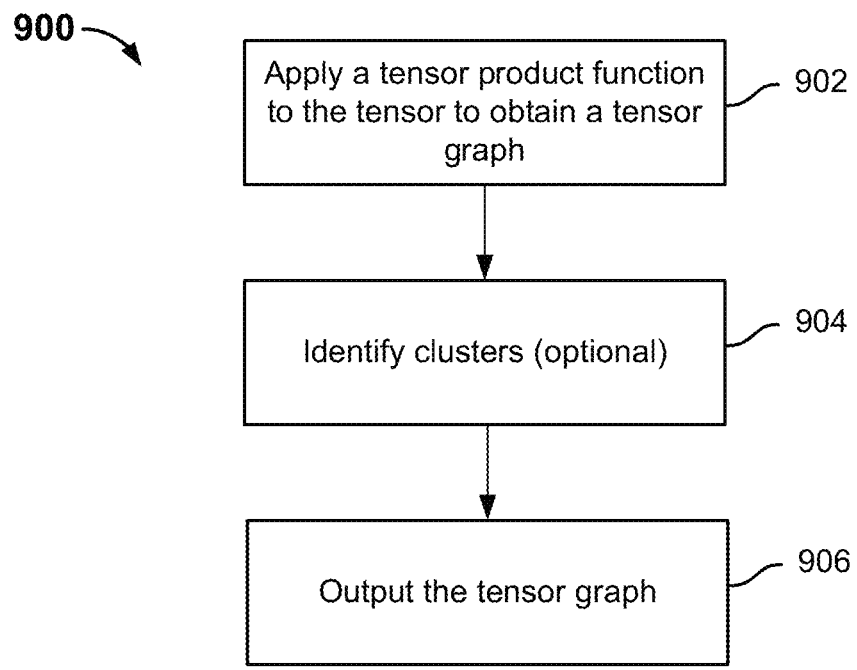
FIG. 9 is a flowchart illustrating an embodiment of a clustering process.

FIG. 9 is a flowchart illustrating an embodiment of a clustering process. Process 900 can be used to implement, for example, 506 of process 500 to cluster the de-noised tensor, or 604 of process 600 to cluster a tensor before it is de-noised.

In this example, the tensor to be clustered, represented as $\mathbb{A}$, includes a plurality of matrices across one or more dimensions. In this example, $\mathbb{A}$ includes M N×N matrices $A_1, A_2, \ldots A_M$, which are 2-dimensional matrices laid out across a third dimension Z. The matrices represent nodes that potentially have interconnections. Changes in a node along dimension Z can affect other nodes; however, such interconnections can be difficult to discern in the native domain.

At 902, a tensor product function is applied to the tensor $\mathbb{A}$ to obtain a tensor graph $\mathbb{G}$ that indicates the strengths of interconnections of nodes across the one or more directions.

In this example, the tensor product function includes convolving the tensor with its transpose:

$$\mathbb{G} = \mathbb{A} * \mathbb{A}^T,$$

where * represents a convolution function.

At 904, clusters in the matrices in the result tensors are optionally identified. The result of the tensor product includes certain peak values. These peak values indicate that the nodes corresponding to the peak matrix entries are the influencers relative to other nodes. In this case, vertices in matrices in the result tensor (e.g., $B'_j$ of tensor 890 or $C'_j$ of tensor 895) are identified using the techniques described above in connection with FIG. 2 (e.g., comparing with a threshold value, selecting the peak values, etc.), and nodes connected to the identified vertices are grouped together. As discussed above, the vertices identified can be first order vertices, second order vertices, or generally j-th order vertices.

In some cases, such as when process 900 is invoked before the de-noising process, 904 can be optionally postponed after the de-noising is completed. At 906, at least a portion of the tensor graph is output to be displayed and/or further processed by another analytic tool or engine. If clusters are identified, cluster information can also be optionally output. In some embodiments, the tensor graph is output to a de-noising stage, e.g., a process such as 700.

In some embodiments, to compute the convolution, a series of sum-of-products are computed as follows:

$$\mathbb{G} = [G_1, G_2, \ldots, G_M] \text{ where}$$

$$G_1 = A_1 A_1^T + A_2 A_2^T + A_3 A_3^T + \ldots + A_{M-1} A_{M-1}^T + A_M A_M^T$$
$$G_2 = A_1 A_2^T + A_2 A_3^T + A_3 A_4^T + \ldots + A_{M-1} A_M^T + A_M A_1^T$$
$$\ldots$$
$$G_k = A_1 A_k^T + A_2 A_{k+1}^T + A_3 A_{k+2}^T \ldots + A_{M-1} A_{k+M-2}^T + A_M A_{k+M-1}^T$$
$$\ldots$$
$$G_M = A_1 A_M^T + A_2 A_1^T + A_3 A_2^T \ldots + A_{M-1} A_{M-2}^T + A_M A_{M-1}^T$$

where when the value of the subscript exceeds M, a modulus of the value is computed such that the subscript has a value less than or equal to M (e.g., k+M−2 corresponds to a subscript of k−2).

The above convolution computation requires many shift and multiplication operations and can be computationally intensive. In some embodiments, to more efficiently compute the convolution, the Fourier Transform of the tensor and the Fourier Transform of the tensor's transpose are multiplied such that the computations mostly require multiplications of vectors, and then an Inverse Fourier Transform is applied to the multiplication result to bring the result to the native domain. As will be shown below, the Fourier Transforms and Inverse Fourier Transforms involve fewer shift and multiplication operations, and can be performed in parallel on separate processors/processor cores, thus resulting in significant performance improvement over the sum-of-product technique.

Figure 10:
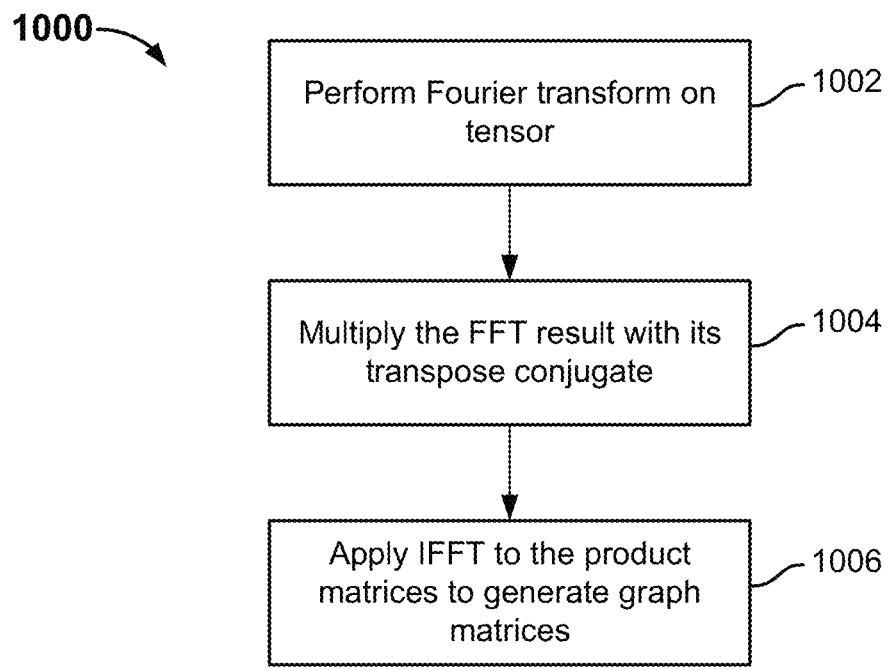
FIG. 10 is a flowchart illustrating an embodiment of a process using Fourier Transform to obtain a tensor convolution result.

FIG. 10 is a flowchart illustrating an embodiment of a process using Fourier Transform to obtain a tensor convolution result. Process 1000 can be used to implement 902 of process 900 and produces an equivalent result as the convolution function described above. FIGS. 11A-11D are diagrams illustrating an example tensor and the intermediate results as it is clustered. Process 1000 is explained in connection with FIGS. 11A-11D for purposes of example.

At 1002, Fourier transform (e.g., a discrete Fourier transform such as an FFT) is performed on the input tensor. For example, in process 500, the input tensor corresponds to the de-noised tensor that is to be clustered; in process 600, the input tensor corresponds to the original tensor to be clustered.

Figure 11A:
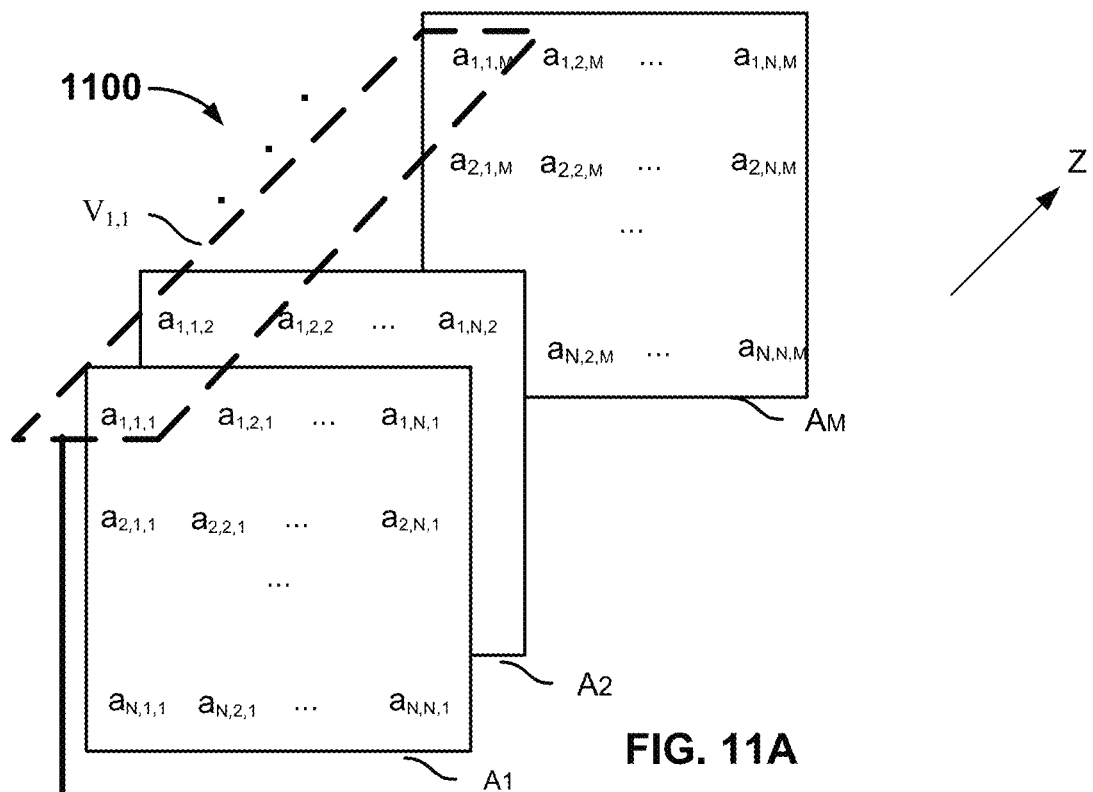
FIGS. 11A-11D are diagrams illustrating an example tensor and the intermediate results as it is clustered.
Figure 11B:
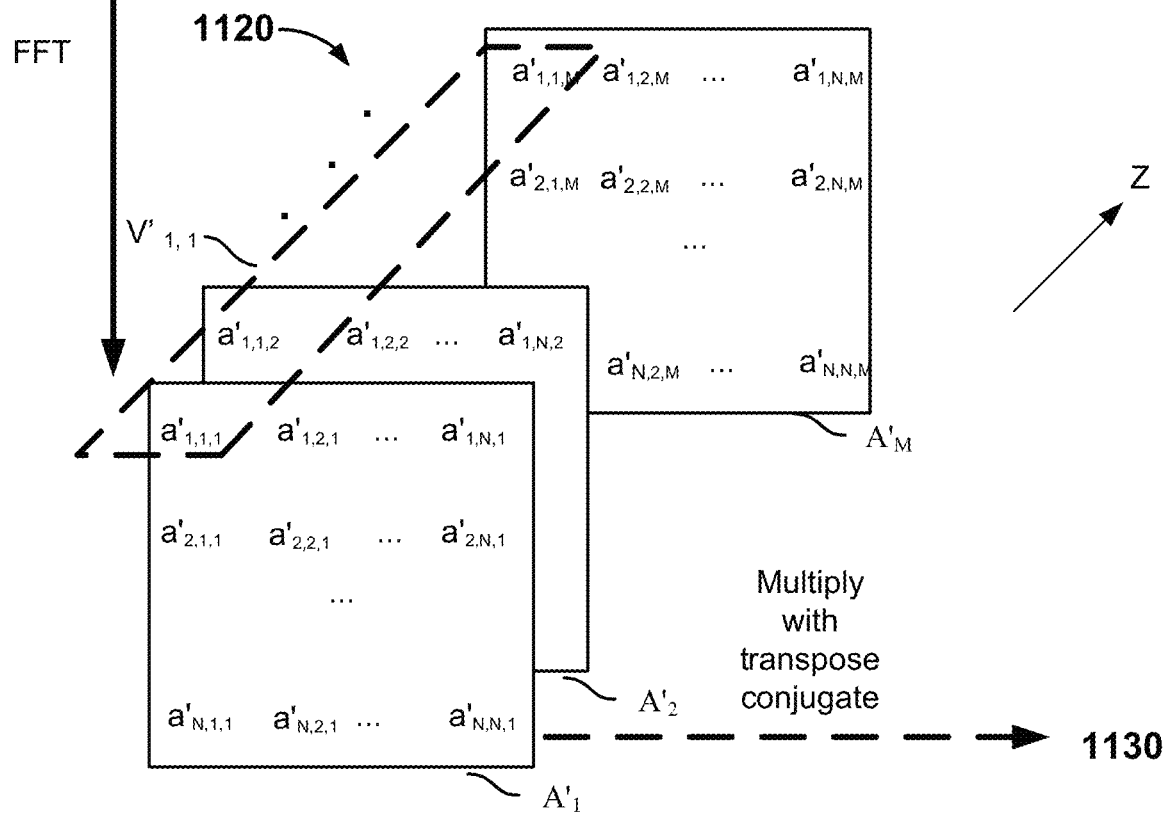

Details regarding how to perform FFT on a tensor are discussed above in connection with 704 of FIG. 7. Referring to FIGS. 11A-11B for an example, tensor 1100 in FIG. 11A corresponds to the input tensor which comprises matrices $A_1, A_2, \ldots A_M$ along the Z dimension, and tensor 1120 in FIG. 11B corresponds to the tensor that has undergone FFT, which comprises harmonic matrices $A'_1, A'_2, \ldots, A'_M$.

At 1004, in the Fourier domain, the FFT result is multiplied with its transpose conjugate to generate a product. In this case, the multiplication includes multiplying each matrix in the tensor with its corresponding transpose conjugate (also referred to as a Hermitian transpose). The product includes multiple product matrices expressed as:

$$Q_1 = A'_1 \cdot (A'_1)^H$$
$$Q_2 = A'_2 \cdot (A'_2)^H$$
$$\ldots$$
$$Q_M = A'_M \cdot (A'_M)^H$$

Figure 11C:
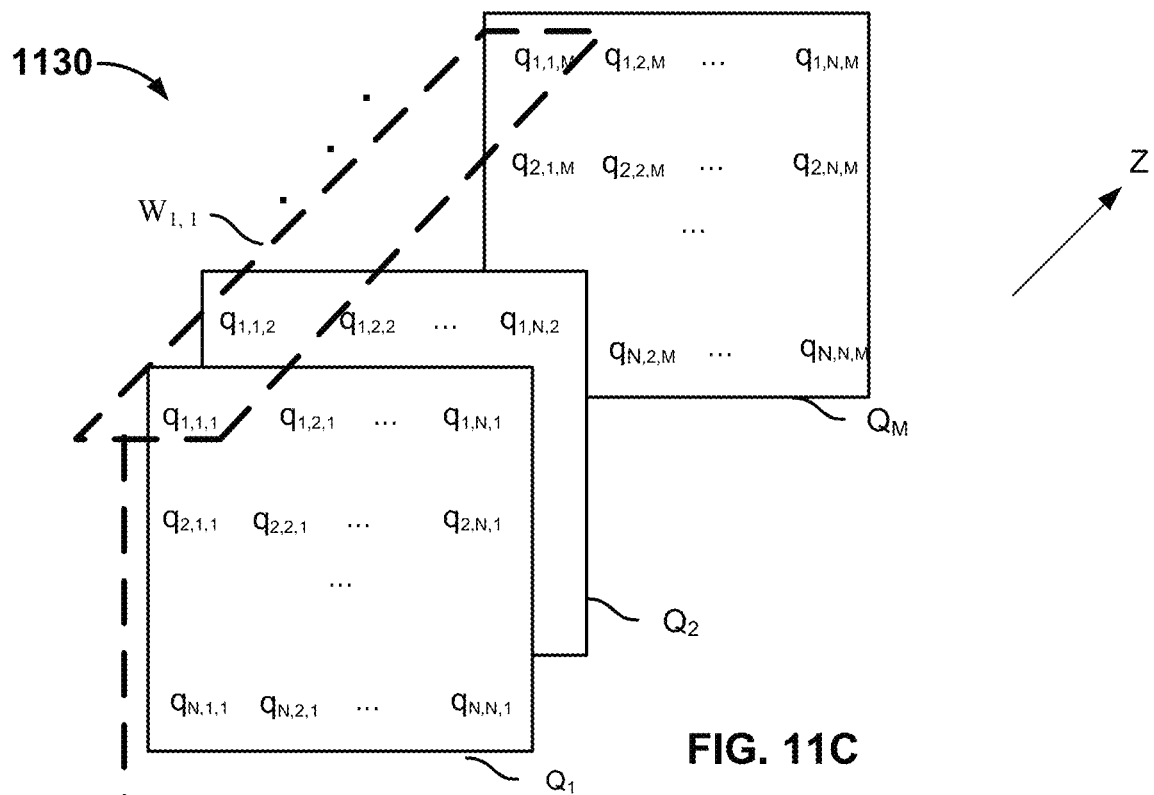

FIG. 11C is a diagram illustrating an example of the product matrices generated in 1004 of process 1000. Each $Q_k$ corresponds to an N×N matrix.

Figure 11D:
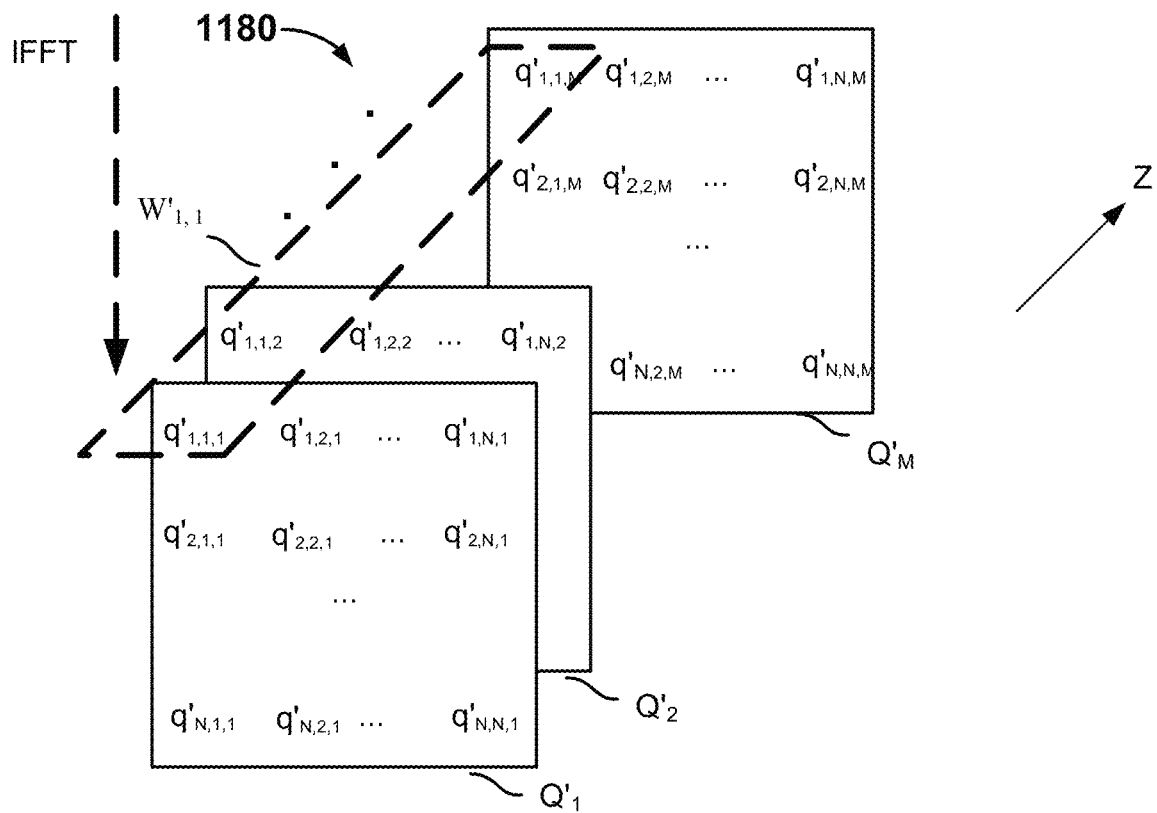

At 1006, an Inverse Fourier Transform (e.g., a discrete inverse Fourier transform such as an IFFT) is applied to the product to generate the clustered result. Specifically, IFFTs are applied to vectors in the product matrices to generate inversely transformed vectors which are arranged to form the result matrices (also referred to as the graph matrices) in the native domain. As shown in the examples of FIGS. 11C-11D, the entries at the same corresponding locations in the matrices in the tensor are grouped to form a plurality of vectors across the Z dimension (e.g., $q_{1,1,1}, q_{1,1,2}, \ldots, q_{1,1,M}$ form vector $W_{1,1}$, $q_{1,2,1}, q_{1,2,2}, \ldots, q_{1,2,M}$ form vector $W_{1,2}$, etc.). An IFFT is performed on the vector to generate a result vector in the native domain (e.g., $W'_{1,1}, W'_{1,2}$, etc.). Entries of the IFFT result vectors occupy the same corresponding locations in result tensor 1180 as the entries of the input vectors in product tensor 1170.

The first result matrix in the native domain (e.g., $Q'_1$ of tensor 1180 of FIG. 11D) indicates how the nodes relate to each other at the base level. Peaks in the values indicate strong interconnections. For example, if $q'_{3,2,1}$ has a value that is higher compared with other values, then it can be inferred that nodes 3 and 2 have a high degree of interconnectivity at the base level. The subsequent result matrices (e.g., $Q'_2$, $Q'_3$, etc.) correspond to harmonics indicating how the relationships change along the changing dimension.

In some embodiments, the densities of the result matrices are optionally computed and compared to provide information about how significant a particular matrix is in terms of its impact on the interconnections of nodes along a particular matrix dimension. The density of the matrix can be computed based at least in part on the energy of the matrices. One example expression of the density for the k-th matrix is:

$$\text{Density}_k = F_k / F_{total} \quad (4)$$

where $F_k$ is the Frobenius norm for the k-th matrix and is computed as:

$$F_k \sqrt{\sum_{i=1}^{N} \sum_{j=1}^{N} |a_{i,j}|^2} \quad (5)$$

where $a_{i,j}$ is the entry (i, j) of the k-th matrix;

$F_{total}$ is the sum of the Frobenius norms of the M result matrices in the result tensor.

If the density of the k-th matrix is greater than the other result matrices, the k-th level is deemed to have the most significant impact on the behaviors (e.g., interconnections) of the nodes in dimension Z. On the other hand, if the density of the k-th matrix is less than the other result matrices, then this level has little impact on the behaviors of the nodes in dimension Z.

Although the above examples illustrate multi-variate, multi-dimensional matrix processing for 3-dimensional tensors, tensors of greater dimensions can be processed similarly. For example, multi-dimensional tensor 400 of FIG. 4 can be processed by performing processes 500 or 600 on individual 3-dimensional tensors such as 402. The 3-dimensional tensors can be processed in parallel to achieve high processing speed, or serially at lower processing speed but requiring smaller amounts of hardware resources.

Some examples are now described to illustrate how to use the processes described above to cluster multi-variate, multi-dimensional tensors.

Figure 12A:
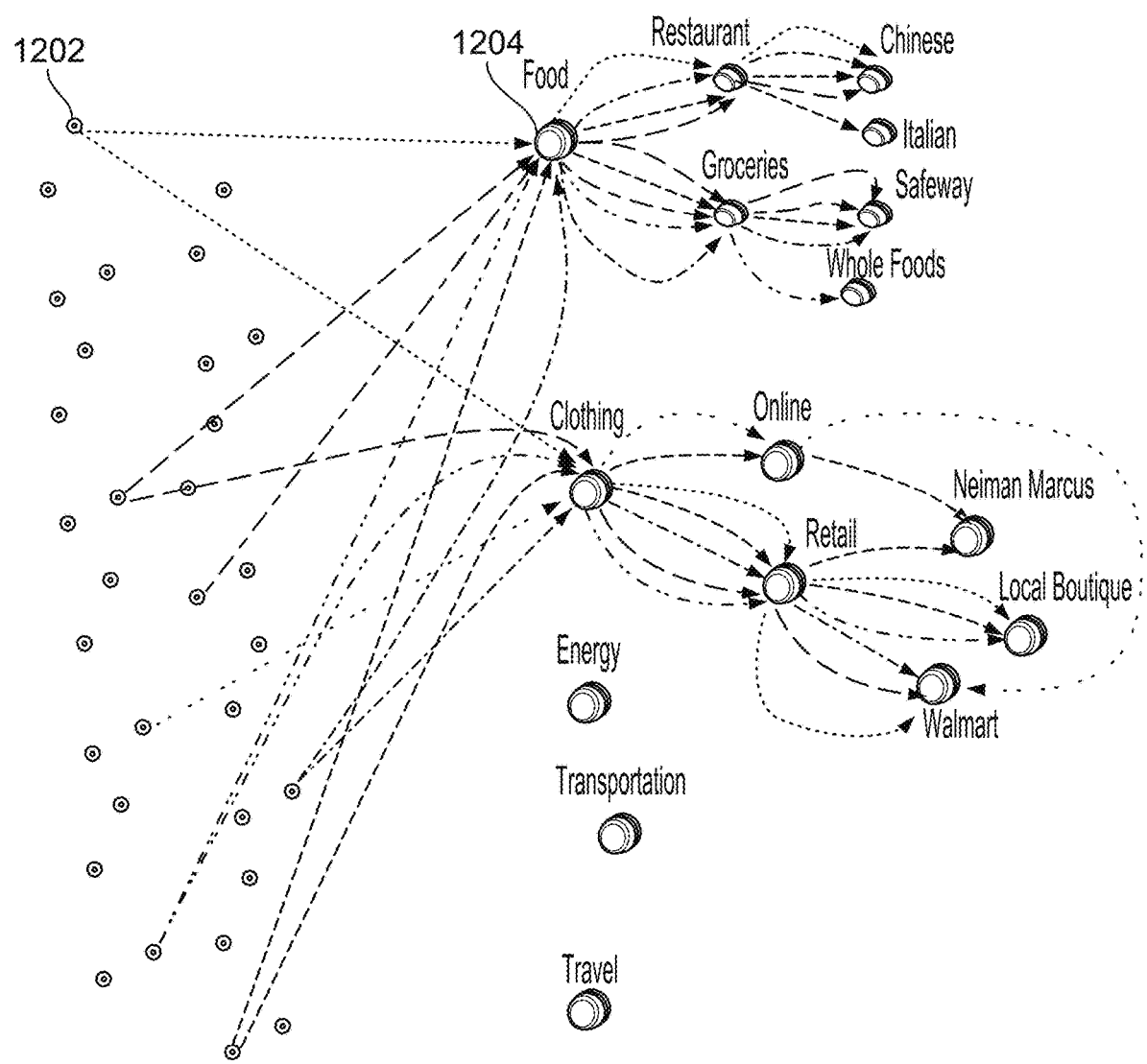
FIG. 12A is a diagram illustrating one set of data collected for a group of consumers given a specific set of spending volume, interest rate, and CCI values.

In one example, purchasing behaviors of consumers are clustered to determine how purchasing behaviors of consumers and brands change across multiple dimensions such as spending volume, interest rate, default profile, consumer confidence index (CCI), etc. FIG. 12A is a diagram illustrating one set of data collected for a group of consumers given a specific set of spending volume, interest rate, and CCI values. Nodes such as 1202 represent consumers, and nodes such as 1204 represent various categories of consumer purchases, brands, etc. When a consumer makes a purchase relating to a particular category or brand of product, an edge is formed between the consumer node and the purchased category/brand to indicate that the purchased category/brand exerts influence on the consumer node. A matrix can be formed based on the graph.

Figure 12B:
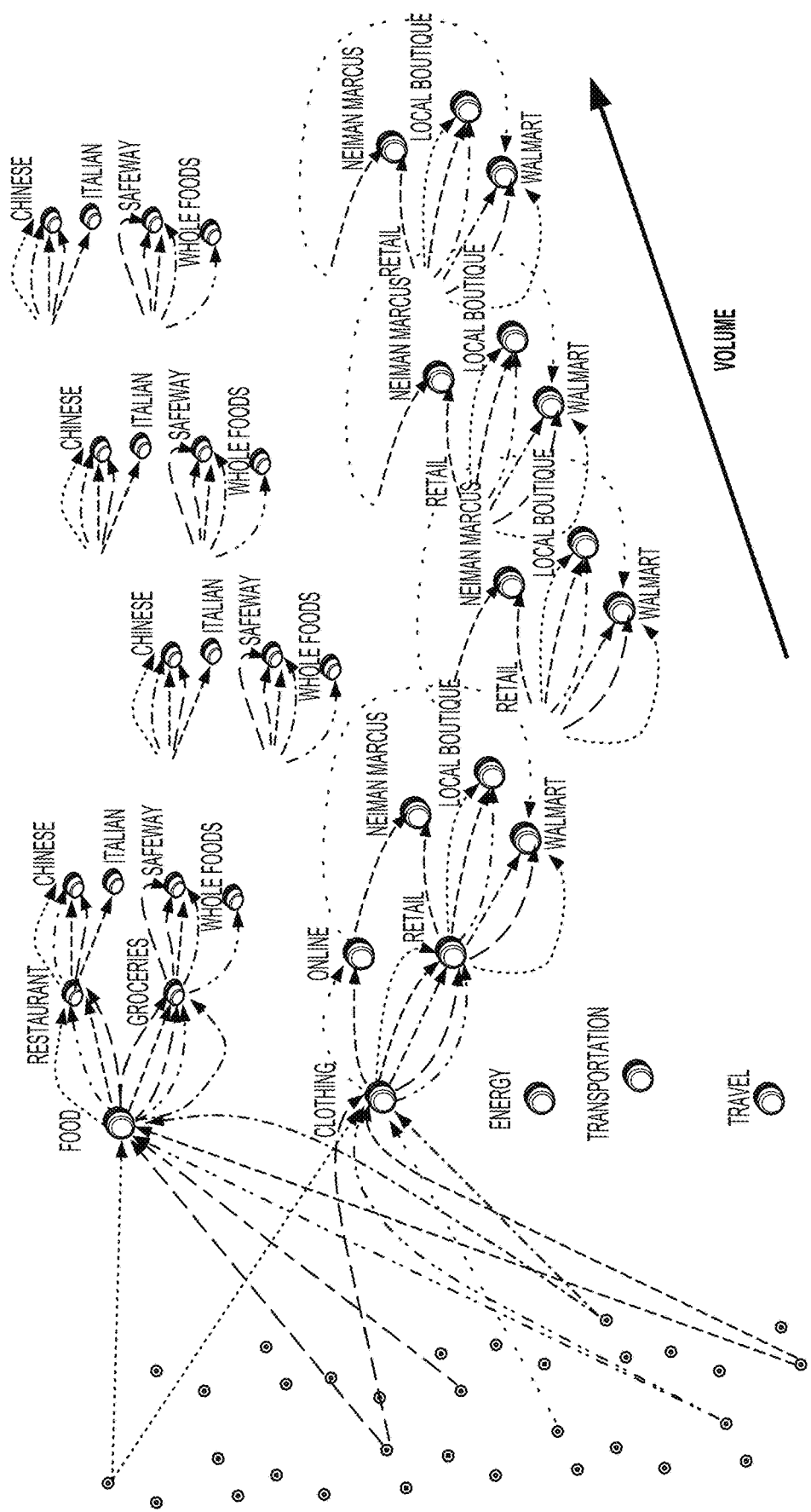
FIG. 12B is a diagram illustrating another set of data showing the purchasing behaviors of the group of consumers with an additional dimension, spending volume (which measures the amount of spending).

FIG. 12B is a diagram illustrating another set of data showing the purchasing behaviors of the group of consumers with an additional dimension, spending volume (which measures the amount of spending). As shown, the data set is collected for varying volumes while keeping the values of other dimensions (e.g., interest rate, default profile, CCI) constant. A matrix can be constructed for a corresponding discrete spending volume. Additional sets of data can be collected with different combinations of values in other dimensions.

Figure 12C:
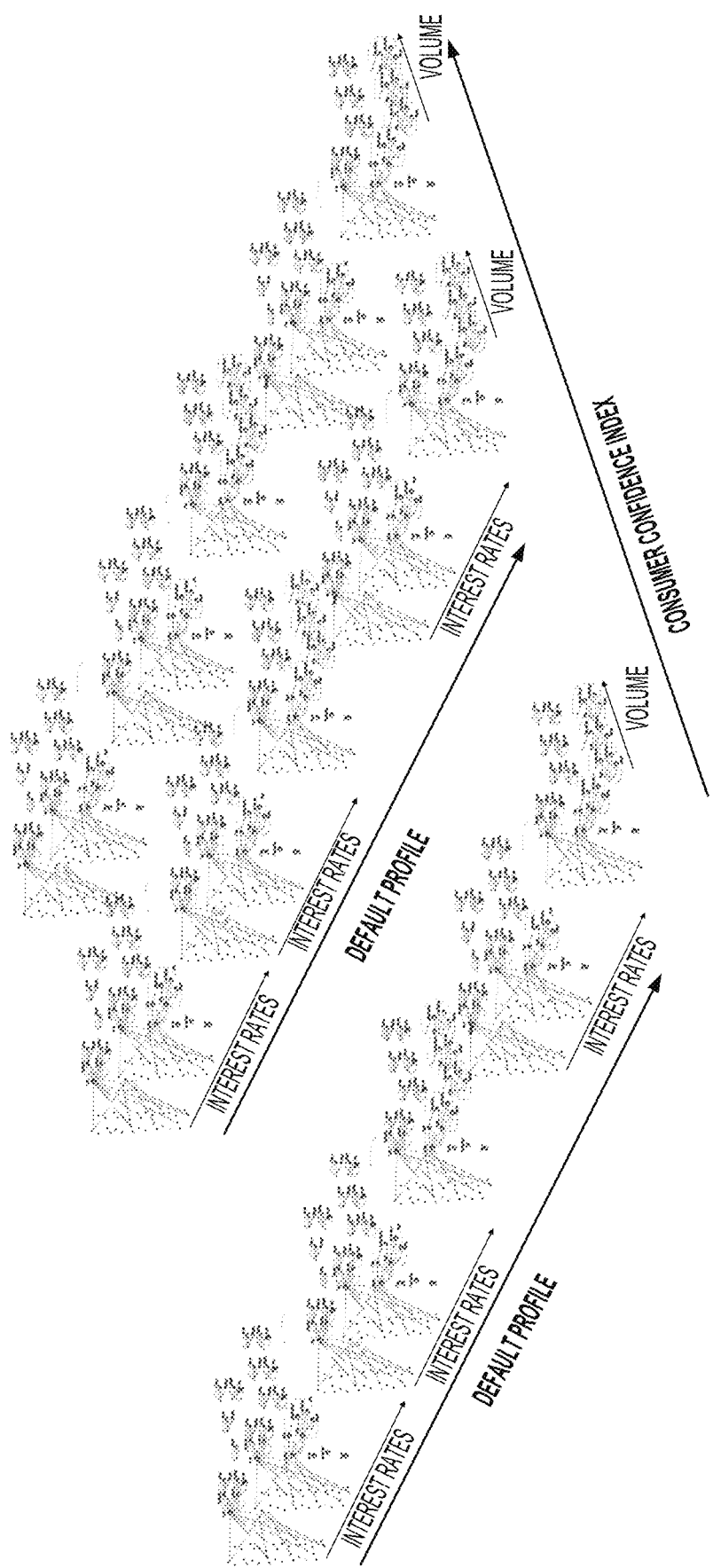
FIG. 12C is a diagram illustrating an example of raw data for the purchasing behaviors of the group of consumers along multiple dimensions.

To account for other factors that influence purchasing behavior, data sets corresponding to different values in other dimensions such as interest rates, consumer confidence index, default profile (which measures the likelihood of default and can be a credit score or the like), etc. can also be collected. FIG. 12C is a diagram illustrating an example of raw data for the purchasing behaviors of the group of consumers along multiple dimensions. In this example, a large number of consumer purchasing activities are collected over a period of time, and the data points are placed into bins along each additional dimension (e.g., spending volume of $ 100-$200 per month, $201-$300 per month, etc.; interest rate of 3%-3.25%, 3.26%-3.5%, etc.; CCI of 90-95, 96-100, etc., default profile of 5%-10%, 11%-15%, etc.).

Figure 12D:
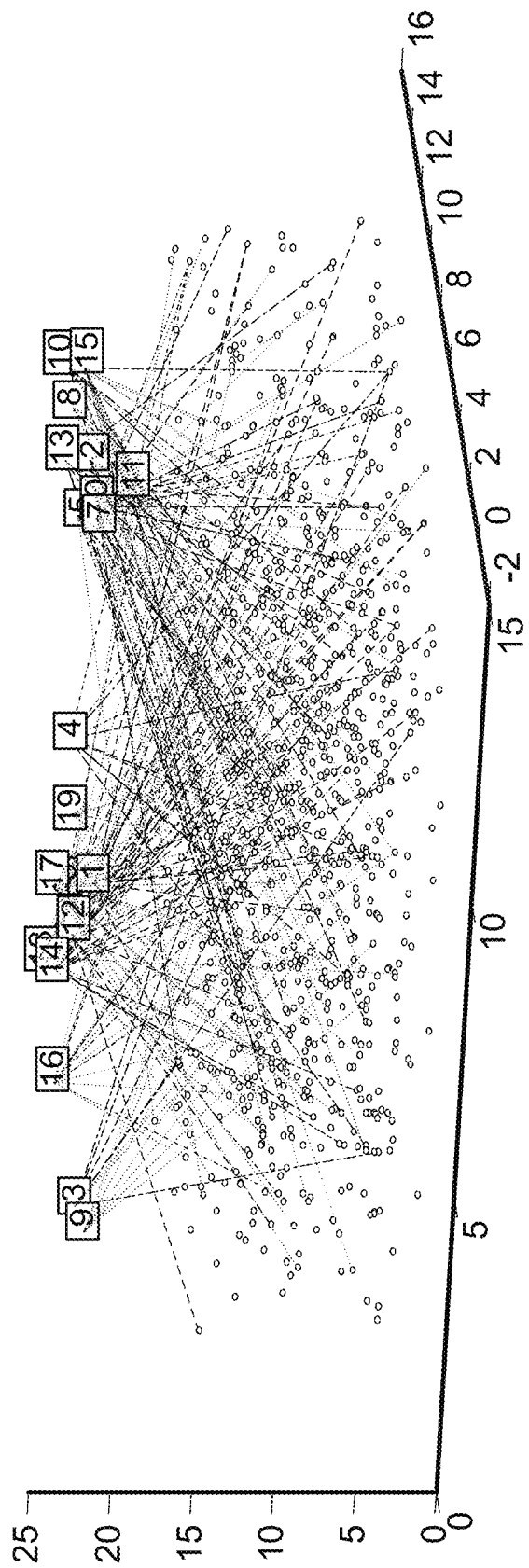
FIG. 12D is a diagram illustrating the example raw data as shown in a visualization tool.

FIG. 12D is a diagram illustrating the example raw data as shown in a visualization tool. The diagram shows how nodes are connected to certain categories/brands without any clustering. The data is highly noisy, and there is no apparent pattern of connections. Note that the axes in the diagram are produced by the visualization tool and do not necessarily correspond to any of the dimensions of the data as discussed above.

Figure 12E:
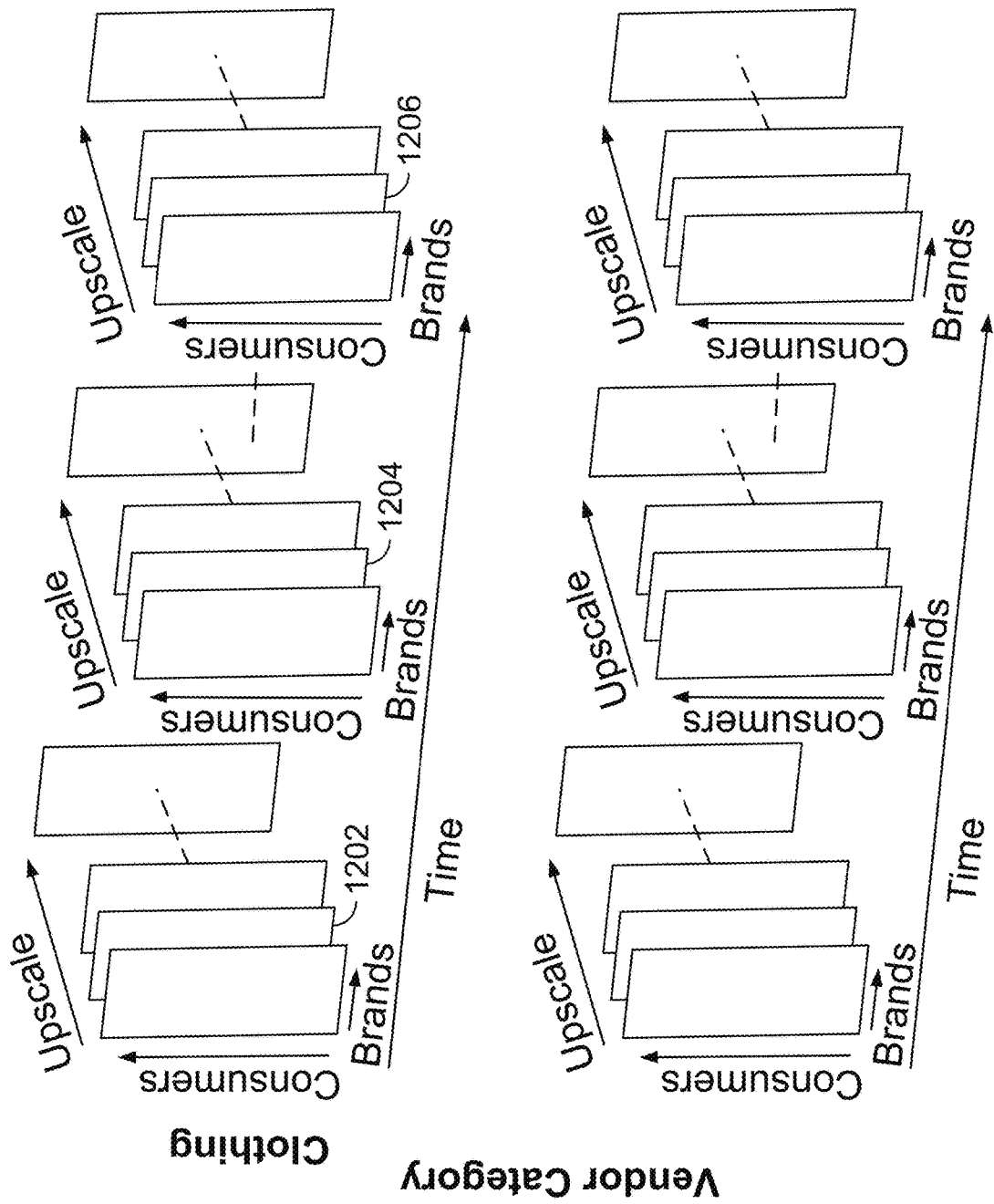
FIG. 12E is a diagram illustrating an example of a 5-dimensional tensor constructed based on the raw data.

FIG. 12E is a diagram illustrating an example of a 5-dimensional tensor constructed based on the raw data. Note that the dimensions of the tensor can be constructed based on the raw data but do not necessarily need to match the dimensions of the raw data.

In this case, the data is relatively noisy, thus process 500 is applied to the 5-dimensional tensor to de-noise the data then cluster along each dimension. Specifically, 3-dimensional tensors such as 1202, 1204, 1206, etc. are individually processed by process 500. The tensors can be processed in parallel.

Figure 12F:
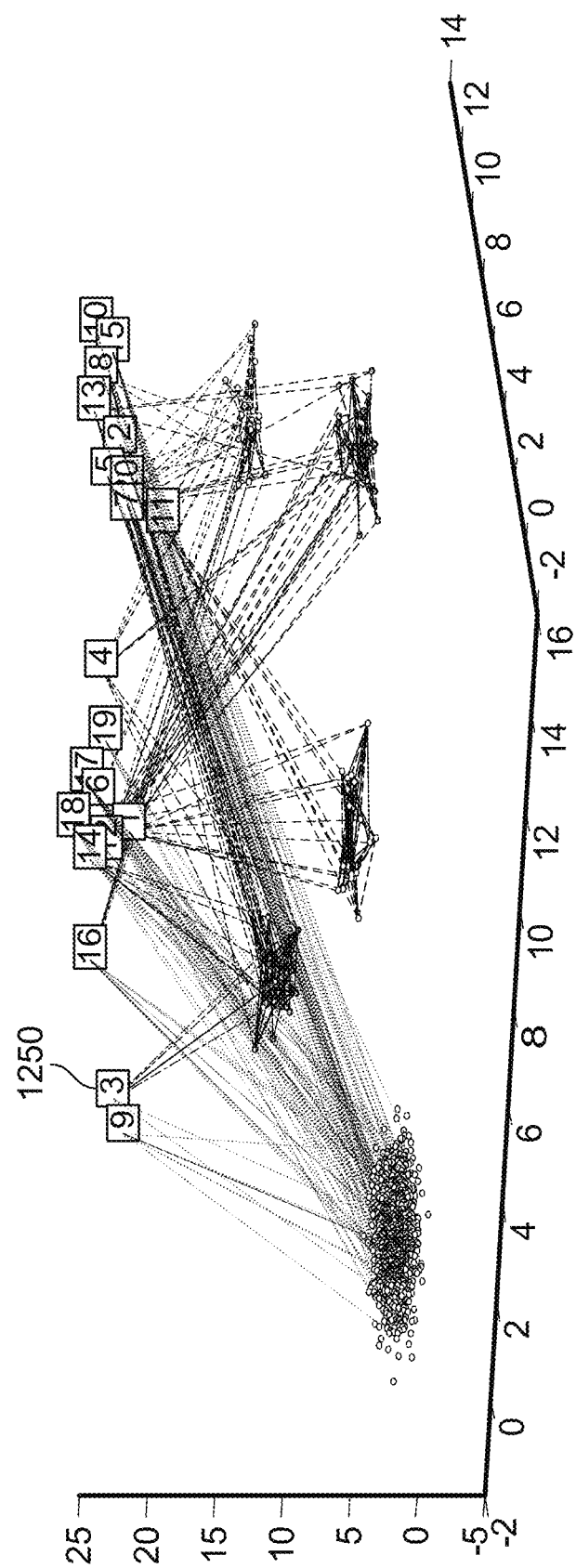
FIGS. 12F, 12G, and 12H are diagrams illustrating the clustered result corresponding to tensors 1202, 1204, and 1206, respectively, as shown by a visualization tool.
Figure 12G:
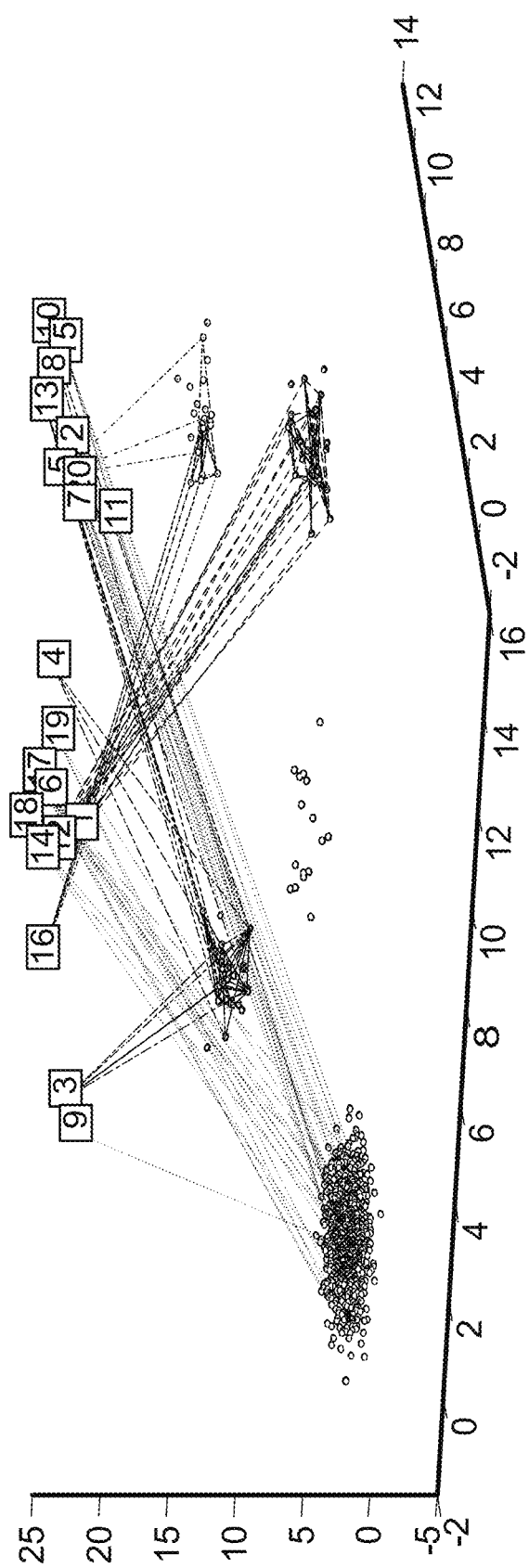
Figure 12H:
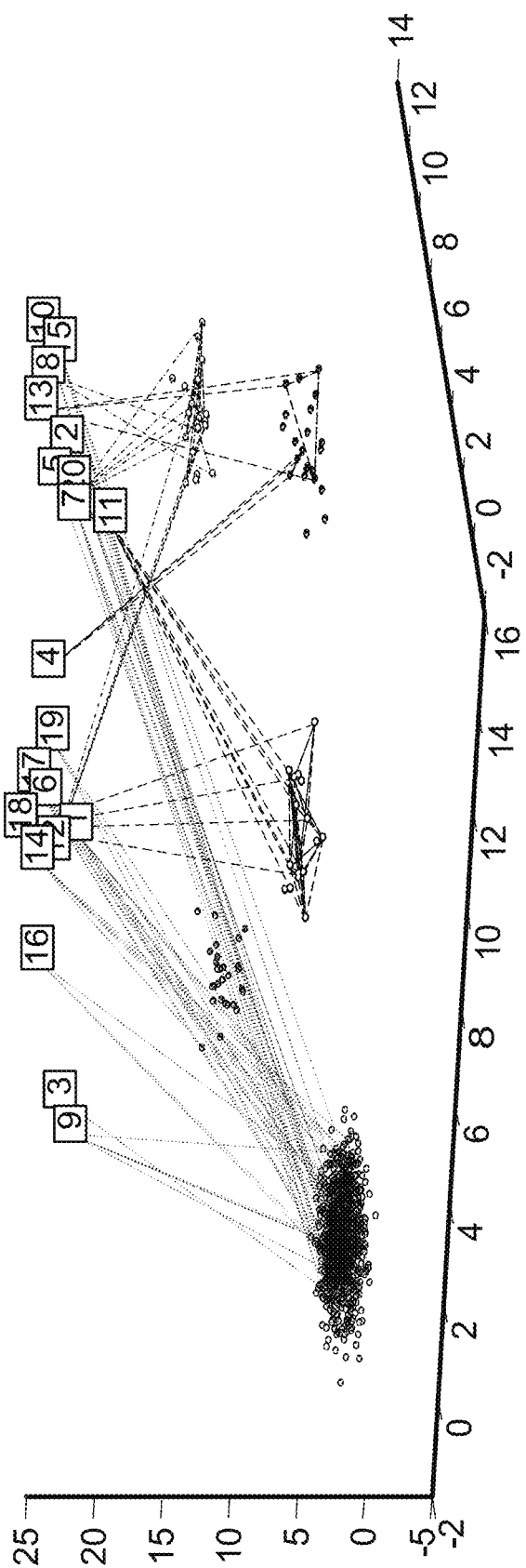

FIGS. 12F, 12G, and 12H are diagrams illustrating the clustered result corresponding to tensors 1202, 1204, and 1206, respectively, as shown by a visualization tool. Boxes such as 1250 are the influential nodes (e.g., brands of products) around which user nodes are clustered. Again, the axes in the diagram are produced by the visualization tool and do not necessarily correspond to any of the dimensions of the data discussed above.

Figure 13:
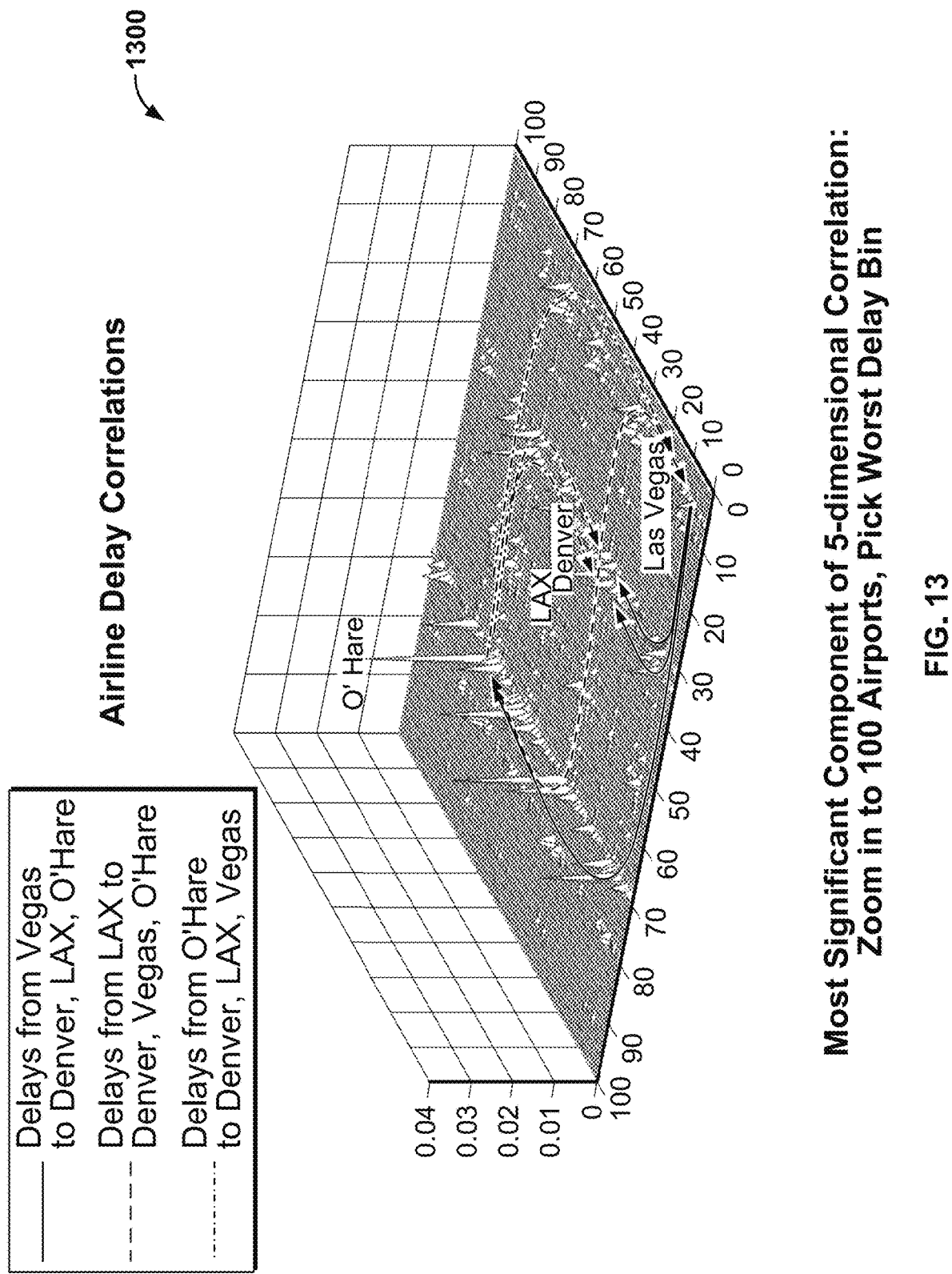
FIG. 13 is a diagram illustrating an example visual display of a slice (a result matrix) of the processed result tensor based on input tensor 400 of FIG. 4.

In another example, airport delay data is collected and clustered. As previously explained, FIG. 4 shows an example set of multi-dimensional airport delay data organized into a 6-dimensional tensor. To determine which departure cities have the greatest impact on arrival cities, process 600 is applied to the 6-dimensional tensor. Specifically, process 600 is applied to each 3-dimensional tensor in FIG. 4. The results are 3-dimensional tensors each comprising "slices" of 2-dimensional matrices, and clustering can be done for each slice using the technique discussed above in connection with FIG. 2. FIG. 13 is a diagram illustrating an example visual display of a slice (a result matrix) of the processed result tensor based on input tensor 400 of FIG. 4. The matrix being displayed shows how airports are correlated for a particular delay bin. In this case, the clustering shows how certain airports are more influential in causing delays at other airports. For example, O'Hare airport, which has the strongest impact on delays at other airports, is shown to be the vertex for a cluster.

In a third example, stocks and their prices over the dimensions of time and Dollar-Euro exchange rate are collected to determine the movements of stocks.

Figure 14A:
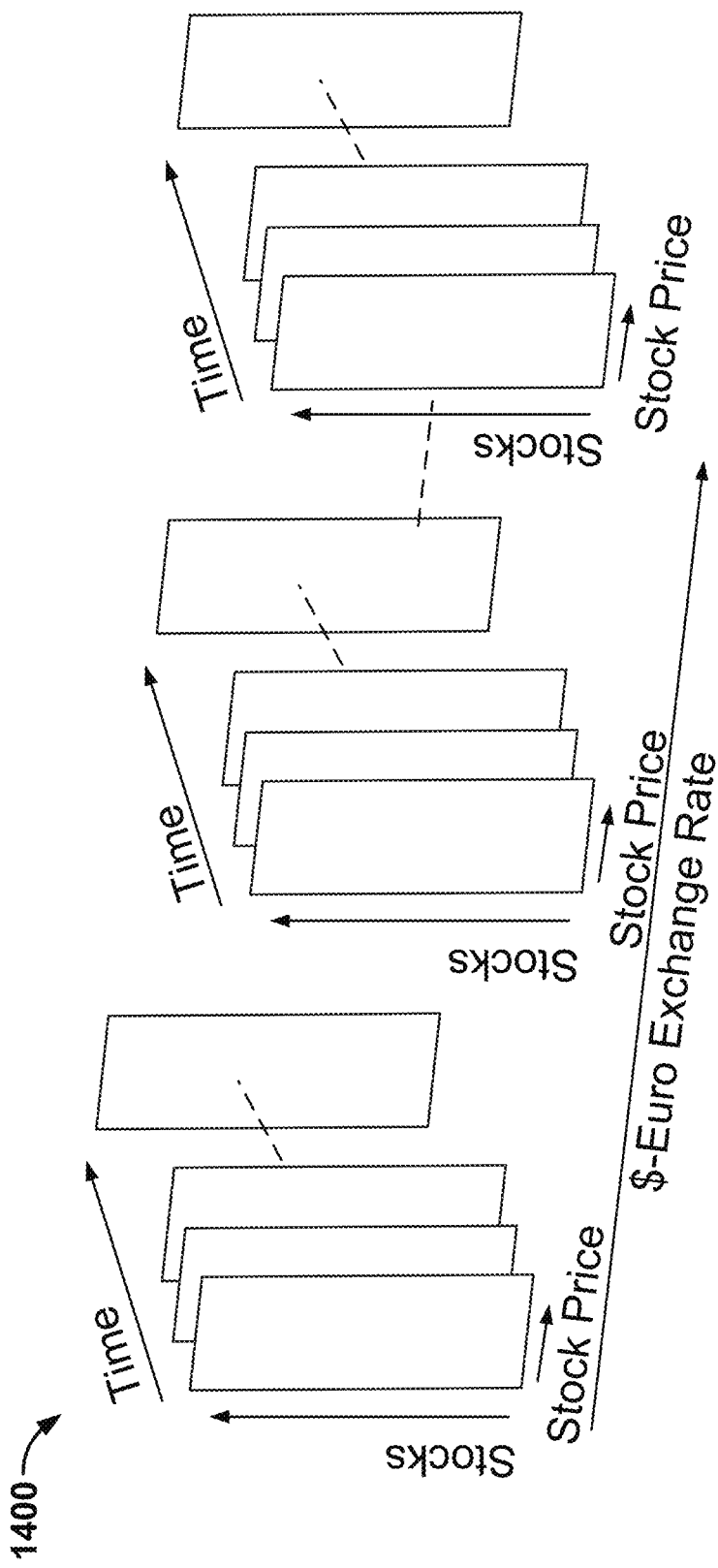
FIG. 14A is a diagram illustrating an example input tensor constructed based on raw data.

FIG. 14A is a diagram illustrating an example input tensor constructed based on raw data. The tensor indicates the changes in the prices of various stocks as time passes and as the exchange rate changes. Some stocks are more affected by time than others (e.g., the prices can be more volatile as the end of the quarter or the end of the year approaches), and some stocks are more affected by the exchange rate.

Figure 14B:
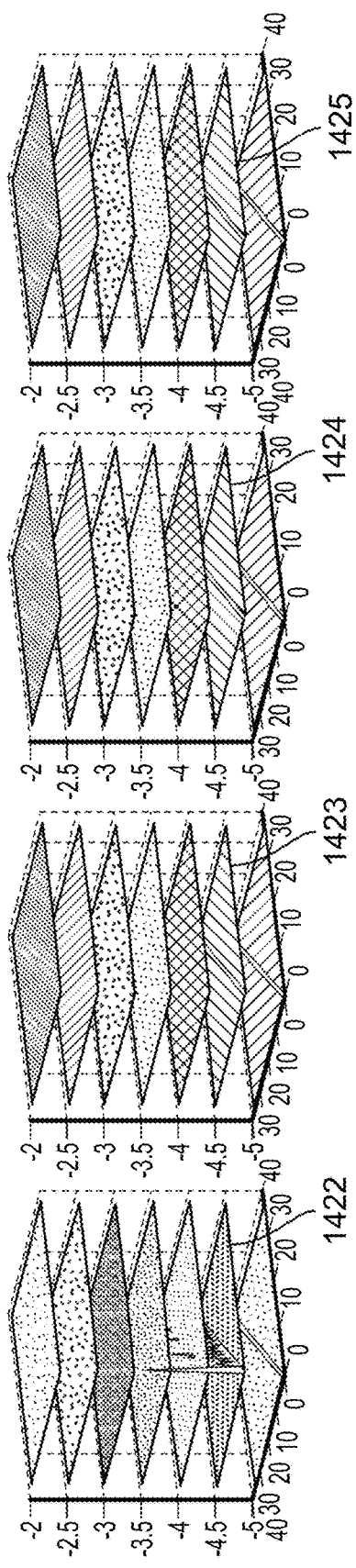
FIG. 14B is a diagram illustrating output tensor 1420.
Figure 14B:
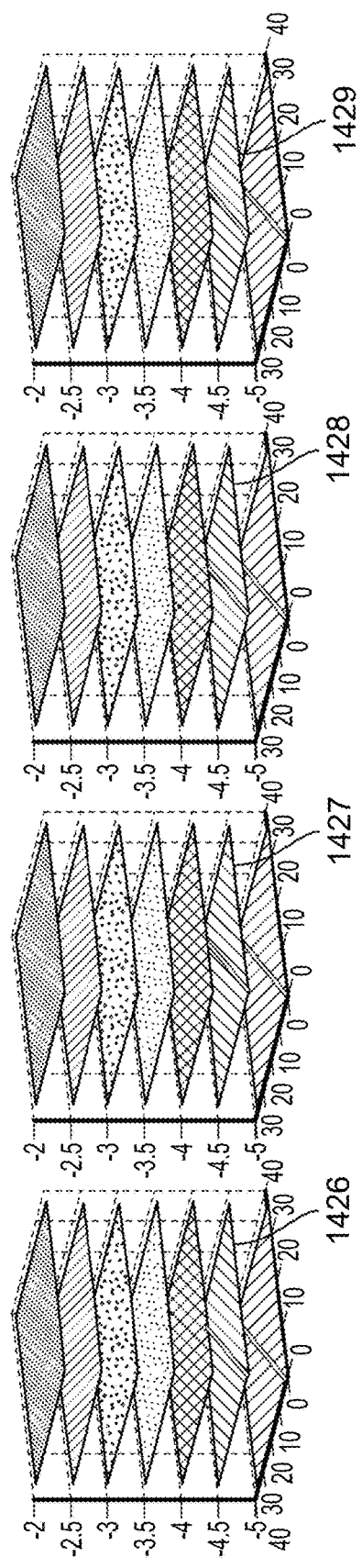
Figure 14C:
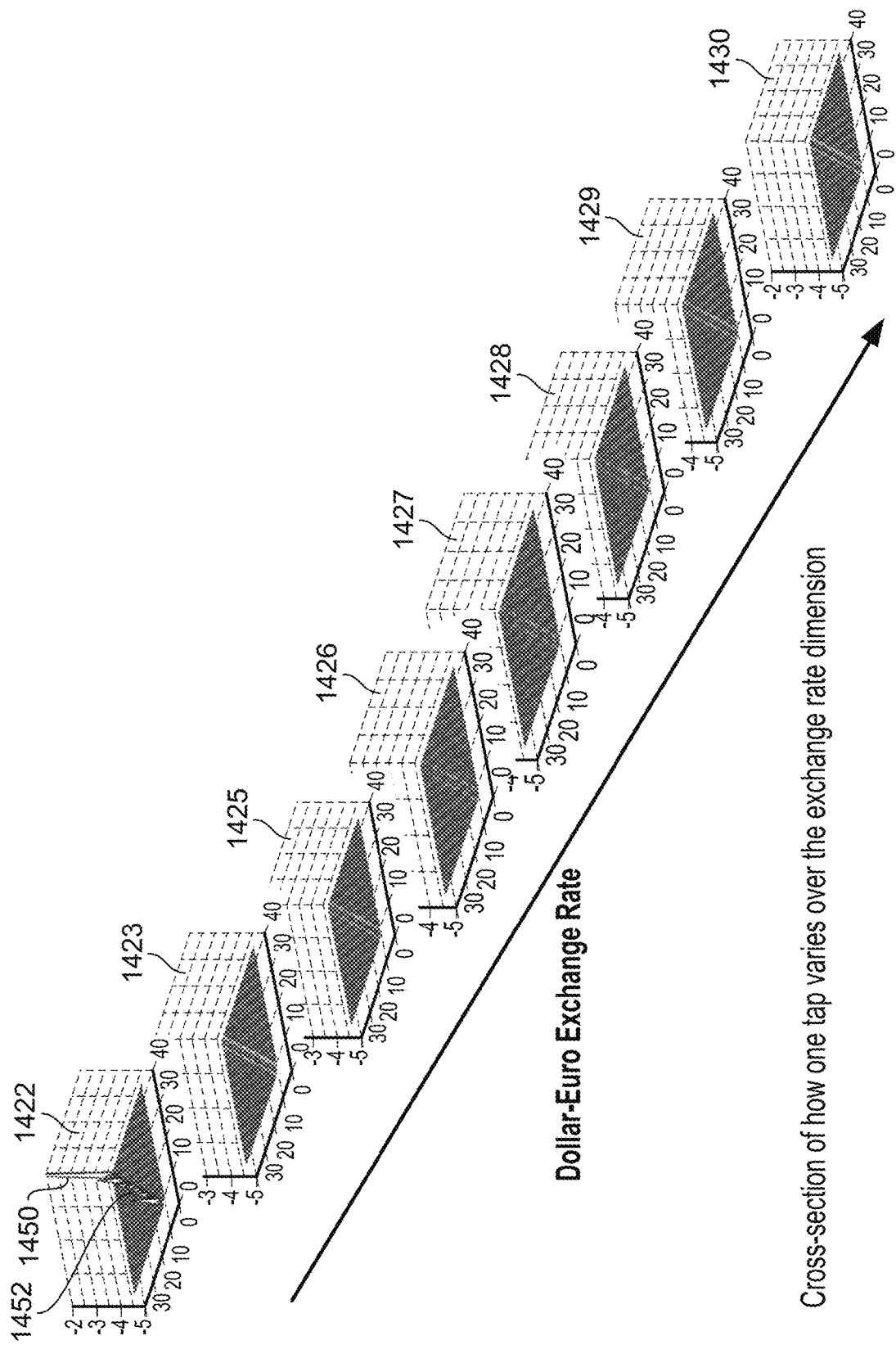
FIG. 14C is a diagram illustrating a selected set of slices.

Tensor 1400 is input into process 500 of FIG. 5 to produce an output tensor 1420. FIG. 14B is a diagram illustrating output tensor 1420. To illustrate the effects of Dollar-Euro exchange rate on the movements of stocks relative to each other, slices of the output tensor are selected where the exchange rate varies while other factors stay constant. FIG. 14C is a diagram illustrating a selected set of slices. Slices 1422-1430 are selected from tensor 1420 and their corresponding plots are displayed to show the effects of Dollar-Euro exchange rate has on the stocks. As shown, the exchange rate has the greatest effect on the stock that corresponds to peak 1450 of plot 1422, since this entry changes the most as the exchange rate changes. In contrast, the stock that corresponds to peak 1452 of plot 1420 is considered to be relatively unaffected by the exchange rate. The analysis results can also be output to a predictive engine which constructs a model for the stocks and makes predictions about their movements. The implementation of the predictive engine is outside the scope of this application.

Clustering data has been disclosed. The technique described provides an analytical solution to data clustering, is computationally more efficient than existing techniques, and allows for multi-variate, multi-dimensional data to be easily clustered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    accessing a matrix (M) representing a graph; wherein:
        the graph comprises a plurality of nodes and a plurality of edges;
        a node in the plurality of nodes represents an object or entity; and
        an edge in the plurality of edges represents an association between two of the plurality of nodes;
    performing an operation on the matrix to generate a result matrix, the operation includes a multiplication function on the matrix;
    identifying one or more clusters among the plurality of nodes, based at least in part on the result matrix, including detecting one or more vertices among the plurality of nodes using the result matrix; and
    outputting information about the identified one or more clusters to be displayed, further processed, or both.

2. The method of claim 1, wherein an entry of the matrix is set according to whether there is an edge between a set of nodes related to the entry.

3. The method of claim 1, wherein:
    the performing of the operation and the identifying of the one or more clusters are a part of processing one or more multi-dimensional tensors on a plurality of processors in parallel.

4. The method of claim 1, wherein the matrix is an N×N matrix, and wherein N corresponds to number of nodes to be clustered.

5. The method of claim 1, wherein the multiplication function on the matrix includes $M^2$.

6. The method of claim 1, wherein the multiplication function on the matrix includes $M(M-I)^j$, and wherein I is an identity matrix and j is a positive integer.

7. The method of claim 1, wherein:
    the multiplication function on the matrix includes $M(M-I)^j$;
    I is an identity matrix and j is a positive integer; and
    the one or more vertices are one or more j-th order vertices.

8. The method of claim 1, wherein the one or more vertices among the plurality of nodes are detected by comparing entries of the result matrix with a threshold value or selecting one or more top entries in the result matrix.

9. The method of claim 1, wherein the plurality of edges are associated with a corresponding plurality of weighted values.

10. The method of claim 1, wherein at least some of the plurality of edges are associated with negative values.

11. The method of claim 1, wherein:
    at least some of the plurality of edges are associated with negative values;
    the one or more vertices among the plurality of nodes are detected by identifying one or more entries of the result matrix that exceed a negative threshold value or selecting one or more bottom entries in the result matrix; and
    the one or more clusters are identified as one or more unfriendly clusters.

12. The method of claim 1, wherein:
    at least some of the plurality of edges are associated with negative values;
    the one or more vertices among the plurality of nodes are detected by identifying one or more entries of the result matrix that exceed a negative threshold value or selecting one or more bottom entries in the result matrix;
    the one or more clusters are identified as one or more unfriendly clusters; and
    the method further comprises:
        clustering unconnected nodes in an identified unfriendly cluster to be in a friendly cluster.

13. A system, comprising:
    one or more processors configured to:
        access a matrix (M) representing a graph; wherein:
            the graph comprises a plurality of nodes and a plurality of edges;
            a node in the plurality of nodes represents an object or entity; and
            an edge in the plurality of edges represents an association between two of the plurality of nodes;
        perform an operation on the matrix to generate a result matrix, the operation includes a multiplication function on the matrix;
        identify one or more clusters among the plurality of nodes, based at least in part on the result matrix, including detecting one or more vertices among the plurality of nodes using the result matrix; and
        output information about the identified one or more clusters to be displayed, further processed, or both; and
    one or more memories coupled to the one or more processors and configured to provide the one or more processors with instructions.

14. The system of claim 13, wherein an entry of the matrix is set according to whether there is an edge between a set of nodes related to the entry.

15. The system of claim 13, wherein:
to perform the operation and to identify the one or more clusters are a part of processing one or more multi-dimensional tensors on a plurality of processors in parallel.

16. The system of claim 13, wherein the matrix is an N×N matrix, and wherein N corresponds to number of nodes to be clustered.

17. The system of claim 13, wherein the multiplication function on the matrix includes $M^2$.

18. The system of claim 13, wherein the multiplication function on the matrix includes $M(M-I)^j$, and wherein I is an identity matrix and j is a positive integer.

19. The system of claim 13, wherein:
the multiplication function on the matrix includes $M(M-I)^j$;
I is an identity matrix and j is a positive integer; and
the one or more vertices are one or more j-th order vertices.

20. The system of claim 13, wherein the one or more vertices among the plurality of nodes are detected by comparing entries of the result matrix with a threshold value or selecting one or more top entries in the result matrix.

21. The system of claim 13, wherein the plurality of edges are associated with a corresponding plurality of weighted values.

22. The system of claim 13, wherein at least some of the plurality of edges are associated with negative values.

23. The system of claim 13, wherein:
at least some of the plurality of edges are associated with negative values;
the one or more vertices among the plurality of nodes are detected by identifying one or more entries of the result matrix that exceed a negative threshold value or selecting one or more bottom entries in the result matrix; and
the one or more clusters are identified as one or more unfriendly clusters.

24. The system of claim 13, wherein:
at least some of the plurality of edges are associated with negative values;
the one or more vertices among the plurality of nodes are detected by identifying one or more entries of the result matrix that exceed a negative threshold value or selecting one or more bottom entries in the result matrix;
the one or more clusters are identified as one or more unfriendly clusters; and
the one or more processors are further configured to:
cluster unconnected nodes in an identified unfriendly cluster to be in a friendly cluster.

25. A computer program product embodied in a tangible non-transitory computer readable storage medium and comprising computer instructions for:
accessing a matrix (M) representing a graph; wherein:
the graph comprises a plurality of nodes and a plurality of edges;
a node in the plurality of nodes represents an object or entity; and
an edge in the plurality of edges represents an association between two of the plurality of nodes;
performing an operation on the matrix to generate a result matrix, the operation includes a multiplication function on the matrix;
identifying one or more clusters among the plurality of nodes, based at least in part on the result matrix, including detecting one or more vertices among the plurality of nodes using the result matrix; and
outputting information about the identified one or more clusters to be displayed, further processed, or both.

\* \* \* \* \*